United States Patent
Meller et al.

(10) Patent No.: US 7,676,479 B2
(45) Date of Patent: Mar. 9, 2010

(54) METHOD AND SYSTEM FOR UPDATING VERSIONS OF CONTENT STORED IN A STORAGE DEVICE

(75) Inventors: Evyatar Meller, Petach-Tikva (IL); Sharon Peleg, Ramat Hasharon (IL)

(73) Assignee: Red Bend Ltd., Hod-Hasharon (IL)

( * ) Notice: Subject to any disclaimer, the term of this patent is extended or adjusted under 35 U.S.C. 154(b) by 877 days.

(21) Appl. No.: 10/885,323

(22) Filed: Jul. 7, 2004

(65) Prior Publication Data

US 2005/0027758 A1    Feb. 3, 2005

Related U.S. Application Data

(60) Provisional application No. 60/484,677, filed on Jul. 7, 2003.

(51) Int. Cl.
  *G06F 17/00* (2006.01)
  *G06F 17/30* (2006.01)
  *G06F 9/44* (2006.01)
(52) U.S. Cl. .................. 707/101; 707/203; 717/170
(58) Field of Classification Search ......... 707/100–102, 707/104.1, 203; 709/203, 247; 717/170
  See application file for complete search history.

(56) References Cited

U.S. PATENT DOCUMENTS

| | | | | |
|---|---|---|---|---|
| 5,805,899 A | * | 9/1998 | Evans et al. | 717/170 |
| 5,813,017 A | * | 9/1998 | Morris | 707/204 |
| 6,018,747 A | * | 1/2000 | Burns et al. | 707/203 |
| 6,163,811 A | * | 12/2000 | Porter | 709/247 |
| 6,298,353 B1 | * | 10/2001 | Apte | 707/103 R |
| 6,317,754 B1 | * | 11/2001 | Peng | 707/203 |
| 6,321,236 B1 | * | 11/2001 | Zollinger et al. | 707/203 |
| 6,374,250 B2 | * | 4/2002 | Ajtai et al. | 707/101 |
| 6,389,592 B1 | * | 5/2002 | Ayres et al. | 717/172 |
| 6,546,552 B1 | | 4/2003 | Peleg | |
| 6,832,373 B2 | * | 12/2004 | O'Neill | 717/171 |
| 6,925,467 B2 | * | 8/2005 | Gu et al. | 707/101 |
| 7,082,603 B2 | * | 7/2006 | Hisatake | 717/173 |
| 7,096,501 B2 | * | 8/2006 | Kouznetsov et al. | 726/24 |
| 7,099,899 B2 | * | 8/2006 | Choy et al. | 707/203 |
| 2002/0010740 A1 | * | 1/2002 | Kikuchi et al. | 709/203 |
| 2002/0087500 A1 | * | 7/2002 | Berkowitz et al. | 707/1 |
| 2002/0160833 A1 | * | 10/2002 | Lloyd et al. | 463/29 |

(Continued)

OTHER PUBLICATIONS

Baker, Brenda.S., et al.; "Compressing Differences of Executable Code" *Workshop on Compiler Support for System Software and ACM Sigplan*, pp. 1-10; (Apr. 22, 1999), XP00231522.

*Primary Examiner*—Miranda Le
(74) *Attorney, Agent, or Firm*—The Law Office of Michael E. Kondoudis

(57) ABSTRACT

A system and method for updating versions of content stored in a storage device. The system includes an update module for obtaining a conversion element and a small delta, and a converted old items generator for generating converted old items by applying the conversion element to items of an old version. The system further includes a data entries generator for generating data entries based on the modified data entries and on the converted old item, and a new version generator for generating a new version of content by applying the commands and the data entries to the old version.

38 Claims, 17 Drawing Sheets

U.S. PATENT DOCUMENTS

| | | | |
|---|---|---|---|
| 2003/0004990 A1* | 1/2003 | Draper | 707/511 |
| 2003/0023898 A1* | 1/2003 | Jacobs et al. | 714/15 |
| 2003/0212712 A1* | 11/2003 | Gu et al. | 707/200 |
| 2003/0217193 A1* | 11/2003 | Thurston et al. | 709/321 |
| 2003/0233574 A1* | 12/2003 | Kouznetsov et al. | 713/201 |
| 2004/0062130 A1* | 4/2004 | Chiang | 365/230.03 |
| 2004/0230624 A1* | 11/2004 | Frolund et al. | 707/204 |
| 2005/0010576 A1* | 1/2005 | Ren et al. | 707/100 |
| 2005/0102660 A1* | 5/2005 | Chen et al. | 717/168 |
| 2008/0098160 A1* | 4/2008 | Slyz et al. | 711/103 |

* cited by examiner

1001

905': start = addr (905)
   length=size (905) +size (909)
   shift = 0
906': start = addr (906) + size (909)
   length = size (906)+ size (910)
   shift = size (909)
907': start = addr (907) + size (909)+ size (910)
   length = size (907) + size (910)+ size (912)
   shift = size (909)+ size (910)
908': start = addr(908)+ size(909)+ size(910)+ size(911)+ size(912)
   length = size(908)
   shift = size(909) + size(910)+ size(911)+ size(912)

1003  1004  1002 modify < addr (905), size (905)>, 0 modify < addr (906), size(906) >, size(909)

modify < addr (907),size(907)>, size(909) + size(910)

modify < addr (908),size(908)>,size (909)+ size(910)+
   size (911)+ size (912)

905: start = addr (905)
   length=size (905)
906: start = addr (906)
   length = size (906)
908: start = addr (908)
   length = size (908)

905': start = addr (905')
   length=size (905')
906': start = addr (906')
   length = size (906')
908': start = addr (908')
   length = size (908')

FIG. 11

METHOD AND SYSTEM FOR UPDATING VERSIONS OF CONTENT STORED IN A STORAGE DEVICE

This application claims the benefit of prior U.S. provisional patent application no. 60/484,677 filed Jul. 7, 2003, the contents of which are hereby incorporated by reference in their entirety.

FIELD OF THE INVENTION

This invention relates to creating small update packages for updating versions of content stored in a storage device.

BACKGROUND OF THE INVENTION

U.S. Pat. No. 6,546,552 discloses a method for generating a compact difference result between an old program and a new program. Each program including reference entries that contain reference that refers to other entries in the program. The method includes the steps of scanning the old program and for each reference entry perform steps that include replacing the reference of the entry by a distinct label mark, whereby a modified old program is generated. There is further provided the step of scanning the new program and for each reference entry perform steps that include replacing the reference of the entry by a distinct label mark, whereby a modified new program is generated. There is still further provided the step of generating the specified difference result utilizing directly or indirectly the modified old program and modified new program.

There is a need in the art to provide for a new method and system for updating versions of content stored in a storage device.

SUMMARY OF THE INVENTION

The present invention provides a method for generating a small update package adapted for allowing update of an old version of content to a new version of content, comprising:
(i) obtaining a conversion element associated with said old version and new version and a delta between said old and new versions, said conversion element and said delta form part of an update package;
(ii) generating a small delta that includes modified data entries; the generation of said modified data entries comprising:
  a) applying said conversion element to items of said old version, said items corresponding to data entries in said delta, giving rise to converted old items; and
  b) generating said modified data entries based at least on said data entries and said converted old items;
(iii) generating said small update package by associating said conversion element with said small delta.

The present invention further provides a method for updating an old version of content giving rise to a new version of content, comprising:
(i) obtaining a small update package; said small update package including a small delta, said small delta being associated with a conversion element, said conversion element being associated with said old version and said new version, said small delta including modified data entries and commands;
(ii) applying said conversion element to items of said old version giving rise to converted old items, said items corresponding to modified data entries in said small delta;
(iii) generating data entries based on said modified data entries and on said converted old items; and
(iv) generating said new version by applying said commands and said data entries to said old version.

Yet still further the invention provides a system for generating a small update package between an old version of content and a new version of content, comprising:
an update module for obtaining a conversion element associated with said old version and said new version and a delta between said old and said new versions, said conversion element and said delta form part of an update package;
a small delta generator for generating a small delta that includes modified data entries; the small delta generator is configured to generate said modified data entries including:
  a) applying said conversion element to items of said old version, said items corresponding to data entries in said delta, giving rise to converted old items;
  b) generating said modified data entries based on said data entries and said converted items; and
a small update package generator for generating said small update package by associating said conversion element with said small delta.

The invention still further provides a system for updating an old version of content giving rise to a new version of content, comprising:
an input module configured to obtaining a small update package; said small update package including a small delta said small delta being associated with a conversion element, said conversion element being associated with said old version and said new version, said small delta including modified data entries and commands;
a converted old items generator configured to applying said conversion element to items of said old version giving rise to converted old items, said items corresponding to modified data entries in said small delta;
a data entries generator configured to generating data entries based on said modified data entries and on said converted old items; and
a new version generator for generating said new version by applying said commands and said data entries to said old version.

By another aspect the invention provides a program storage device readable by machine, tangibly embodying a program of instructions executable by the machine to perform method steps for generating a small update package adapted for allowing update of an old version of content to a new version of content, comprising:
(i) obtaining a conversion element associated with said old version and new version and a delta between said old and new versions, said conversion element and said delta form part of an update package;
(ii) generating a small delta that includes modified data entries; the generation of said modified data entries comprising:
  a) applying said conversion element to items of said old version, said items corresponding to data entries in said delta, giving rise to converted old items; and
  b) generating said modified data entries based at least on said data entries and said converted old items;
(iii) generating said small update package by associating said conversion element with said small delta.

Yet still further the invention provides a program storage device readable by machine, tangibly embodying a program of instructions executable by the machine to perform method steps for updating an old version of content giving rise to a new version of content, comprising:

(i) obtaining a small update package; said small update package including a small delta, said small delta being associated with a conversion element, said conversion element being associated with said old version and said new version, said small delta including modified data entries and commands;

(ii) applying said conversion element to items of said old version giving rise to converted old items, said items corresponding to modified data entries in said small delta;

(iii) generating data entries based on said modified data entries and on said converted old items; and generating said new version by applying said commands and said data entries to said old version.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 10 illustrates a difference table and its corresponding reference shift rules in accordance with the example of FIG. 9, according to an embodiment of the invention;

FIG. 11 is a schematic illustration of partial meta-data associated with the old and new versions of FIG. 9, in accordance with one embodiment of the invention;

DETAILED DESCRIPTION OF EXEMPLARY EMBODIMENTS

Figure 1:
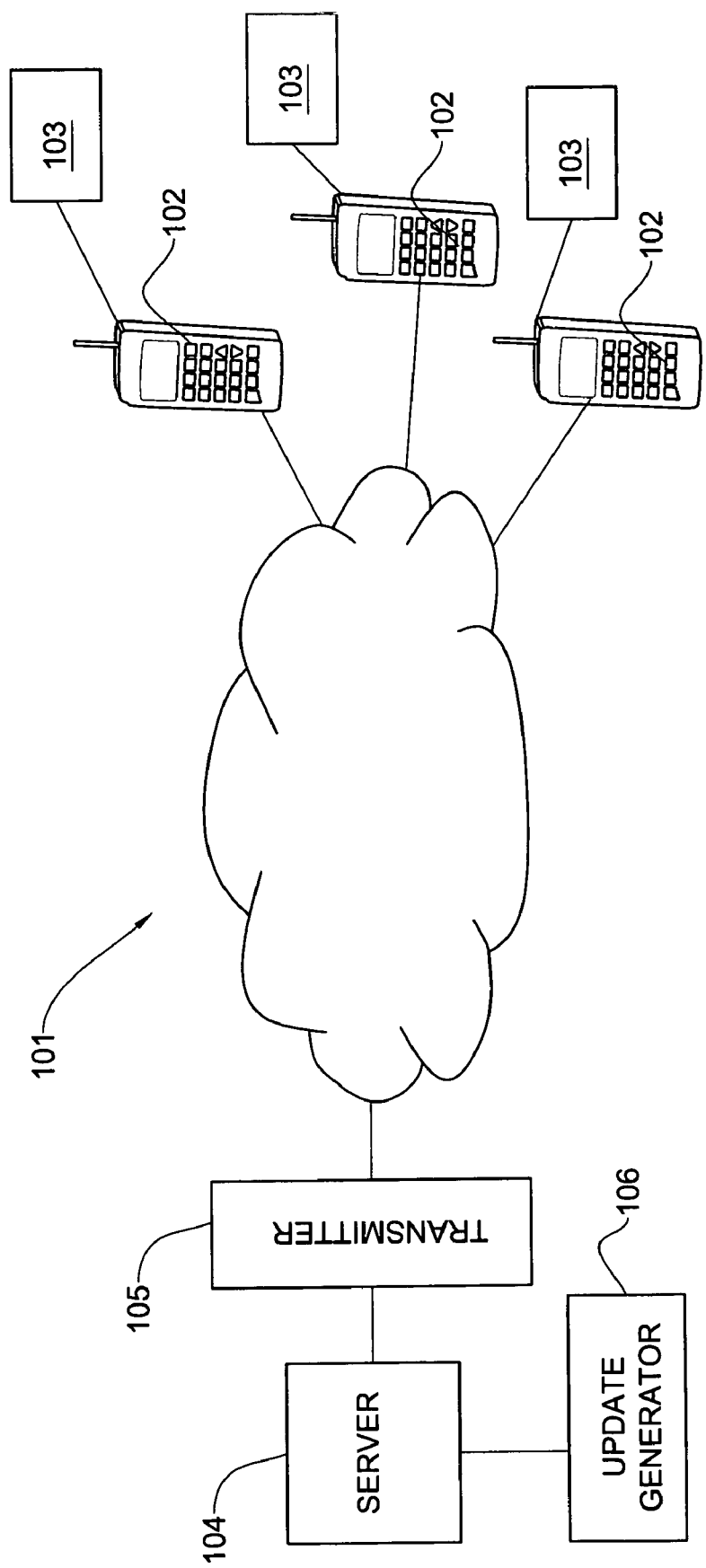
FIG. 1 is a schematic illustration of a system providing update of versions in a cellular network, in accordance with one embodiment of the invention.

FIG. 1 is a schematic illustration of a system 101 providing update of versions in a cellular network, in accordance with one embodiment of the invention. Cellular telephones 102 that are coupled to memory devices 103, execute computer programs (and/or executable programs) that enable their operation. The version of the program currently executing on the cellular telephones is referred to, hereinafter, as old version. Sometimes there is a need to update the programs in order for the telephones 102 to execute a new version thereof. In order to update an old version to a new version an update package is generated on an update generator 106, such as a personal computer (PC). The update version is stored on a server 104 and transmitted, via a transmitter 105 to the cellular telephones 102, where it is used as a basis for an update process.

It should be noted that the system 101 illustrated in FIG. 1 is a non-binding example and the invention is not limited to cellular networks and telephones or to update of computer programs and/or executable programs. Many other types of content require update, such as data stored in storage devices. For example, a Personal Computer (PC), or any other computer, can store files including data required for its operation or for operation of programs executing thereon (such as "info files" known for those versed in the art). Sometimes it is required to update this data via communications lines, for example, via the internet. Alternatively, data stored in databases is sometimes considered as content requiring updates.

Therefore, hereinafter the term "content" will be used instead of "program". In the same way, the term "storage device" will be used instead of the cellular telephones' memory devices 103 in FIG. 1.

That is, in order to update content stored in storage devices, update packages are generated in an update generator, stored in a server and transmitted to the storage devices or to other devices coupled therewith.

It should be noted that in FIG. 1 a storage device (such as a memory device 103) is coupled to a cellular telephone. More generally, a storage device can be coupled to an embedded device. The embedded device can, for example, be a member in a group that includes, e.g., cellular telephones and/or consumer electronic devices (such as television set-top boxes). Alternatively, the storage device can be coupled to a computer.

Figure 2:
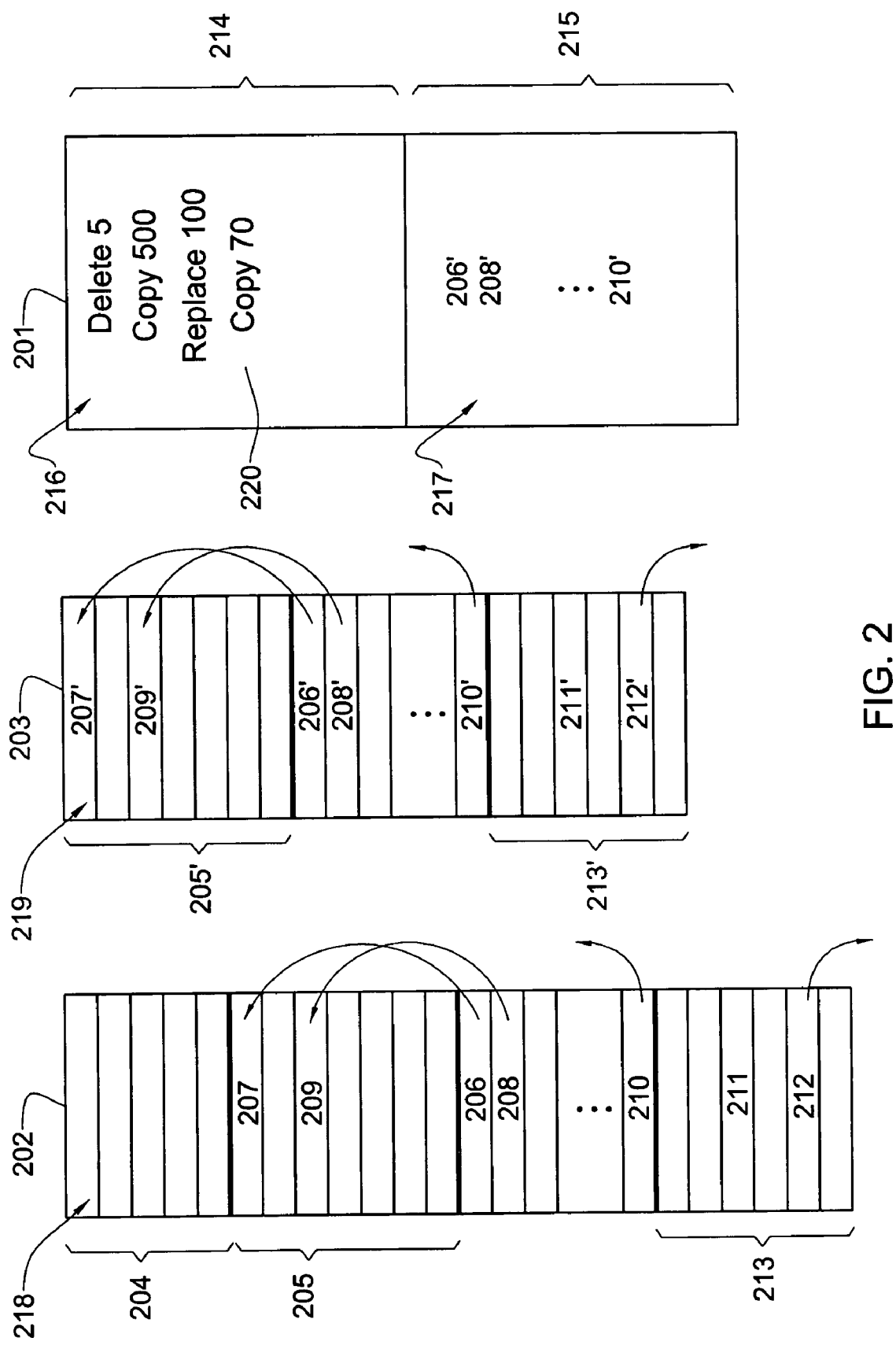
FIG. 2 is a schematic illustration of an update package adapted to update an old version of content into a new version.

Turning now to describing an exemplary update process, FIG. 2 is a schematic illustration of an update package 201 adapted to update an old version of content 202 into a new version of content 203. An old version of content (such as old version 202) is also referred to, shortly, as an "old version". Likewise, a new version of content (such as the new version 203) is referred to, shortly, as a "new version".

It is noted that the update package 201 can be generated in accordance with methods known per se to those versed in the art. Similarly, the ways to apply this update package in order to update the old version 202 to the new version 203 are also known.

It should also be noted that an update package including instructions and their associated data is sometimes referred to as "delta file", "difference file" or shortly as "delta" or "difference", wherein the delta is a collections of modifications occurring while updating an old version to a new version. It is noted that a delta can be generated, for example, as an output produced by a diff tool such as the UNIX diff program, when applied on the old and new versions. Thus, a person versed in the art can appreciate that an update package can be a delta or alternatively, it can include a delta and perhaps additional information.

The old version 202 includes a block 204 of five items, each item can be the size of at least one word, the size of one or more bytes, or any other applicable measurement. The block 204 is followed by a second block 205 of, e.g., five hundred items. Next, the old version 202 includes an item 206 that includes at least a reference (such as a pointer) to a certain item 207 in the second block 205. Items including at least one reference are referred to, hereinafter, as "reference items". For example, a reference item 206 can include an instruction associated with an absolute reference to 207, such as "jump to the absolute address of item 207".

It should be appreciated that if the content represented by the old and new versions (such as 202 and 203) is a computer program, for example, a block can represent a program function, as known to those versed in the art.

It should also be appreciated that a reference is a part of an item referring to some other item or address. A person versed in the art can appreciate that a reference can be, for example, a pointer to a referenced item (such as the address thereof), an indication of some other item or location that includes a reference, a number used to compute an address etc.

In FIG. 2, reference item 206 is followed by another reference item 208, referencing a different item 209 in the second block 205. The reference item 208 is followed by other reference items, all include references to items within the second block 205, the last of them is reference item 210. Whilst not shown in the figure, according to the example there are, e.g. one hundred reference items between reference item 206 and reference item 210, inclusive.

It is appreciated that the old version 202 can include also non-reference items, i.e., items that include no reference. The item 211 is an example to a non-reference item. Unless specifically noted, the term "item" refers, hereinafter, both to reference and non-reference items.

In addition, the old version 202 can include reference items to other items that are not included in the old version 202, i.e., references to items being external to the content, such as reference item 212. For example, if the old version represents a computer program that is loaded to a computer's RAM (Random Access Memory) during execution, such a reference item can refer to another item that is stored in an area of the RAM which is outside the area used to store the program.

Hereinafter, reference items that include at least a reference to an item included in the content are referred to as "explicit reference items", while reference items that include at least a reference to an item that is external to the content are referred to as "implicit reference items".

Back to FIG. 2, whilst not shown in the figure, following reference item 210 there are seventy items. For the matter of convenience, these seventy items (including items 211 and 212) are referred to, hereinafter, as "terminating items" 213. The seventy items include non-reference items (such as item 211) and/or implicit reference items (such as item 212). It should be clarified that the size of any content being updated according to this example is not limited and accordingly any size of any block along this content is non-limited too.

The update package 201 is adapted to modify the old version 202 of the content, generating a new version 203 of the content. An update process operates in accordance with the update package 201 to generate this new version 203.

One difference between the old version 202 and the new version 203 in the example, is the absence of block 204 from the new version 203, where the second block 205 shifts backwards and occupies the position previously occupied by block 204 in the storage device. According to the example, block 204 includes five items, and therefore after deleting 5 items the second block 205 shifts five items backwards. It can be appreciated, thus, that further to block 205's shift backwards, all the items included therein are potentially shifted correspondingly (by five items). Such is the case, e.g., also with items 207 and 209 (and their corresponding items 207' and 209' in the new version). It is noted that item 206 includes a reference to item 207. After shifting item 206 backwards to generate item 206', this item still references item 207, i.e., it references the address of 207 in the old version. It is required to replace the content of item 206' so it will reference item 207' in its new location in the new version.

It should also be noted that the content of the non-reference item 211 that includes no reference and the content of the implicit reference item 212 do not require modification in this case, although their location is also shifted up by five items. However, sometimes implicit reference items (unlike item 212) do need replacement following a shift. Therefore, it should also be noted that the examples and embodiments provided below with reference to explicit reference items can be applicable also to implicit reference items, unless specifically noted otherwise.

Reverting now to the update package 201, it is divided into two sections, a commands section 214 and a data section 215. The commands section includes commands, while the data section includes data entries.

The commands section 214 includes commands for updating the old version 202 to the new version 203. It should be considered that in the current example commands are illustrated as string characters representing one or more operation to be performed by updating the old content (such as "copy", "replace" etc.). However, other ways to represent commands are also applicable, such as using operation codes (shortly referred to as op-codes), wherein each command has a predetermined op-code assigned to it. In addition, sometimes commands are represented by alternative ways to those illustrated in 201. For example, a "replace" command can be represented by an insert command, where inserted content replaces items in the old version that are specifically deleted or not copied to the new version.

In accordance with this example, when updating the old version 202 to the new version 203, the update process operating on the update package 201 holds at least two pointers to positions in the update package and two pointers to positions in the old and new versions. One pointer 216 (referenced hereinafter as a "commands pointer") points to the commands section 214, and the other 217 (referenced hereinafter as a "data pointer") to the data section 215. In addition, one pointer 218 (referenced hereinafter as a "old pointer") points to a position in the old version, while another one 219 (referenced hereinafter as a "new pointer") points to the new version. Initially, the commands pointer points to the first command in the commands section, the data pointer points to the first entry in the data section, the old pointer points to the beginning of the old version and the new pointer points to the beginning of the new version.

As shown, the first command included in the commands section 214 is for deleting five items, that is, deleting five items from the position pointed to by the old pointer 218, thereby deleting block 204. The old pointer 218 moves to point to the beginning of block 205, i.e., it points to item 207. Next, the update package includes a command for copying five hundreds items to the current position of the new pointer 219, thereby shifting the block 205 five items backwards, giving rise to block 205'. The old pointer 218 moves to point to item 206, while the new pointer 219 moves to point to the position where item 206' will be positioned in accordance with the example below.

After copying block 205, prima facie it would be required to copy one hundred items 206, 208, . . . , 210, while shifting their location five blocks up, giving rise to the hundred corresponding items 206', 208', . . . , 210'. However, as explained before, the included references of items 206', 208', . . . , 210' needs to be updated to reference 207', 209', . . . instead of 207, 209, . . . That is, these hundred reference items or at least part thereof need to be replaced. Instead of copying a reference item and then replacing it by a shifted reference, it is possible to replace the item on the first hand, saving the copy operation. The update package 201 includes therefore a command 220 to replace (referenced, hereinafter, as a "replacement command") a hundred items from the current position of the old pointer 218 with a hundred items stored in the data section 215 (the first of them is pointed to by the data pointer 217). As can be seen in FIG. 2, the corresponding replacing items for items 206, 208, . . . , 210, as stored in the data section 215, are 206', 208', . . . , 210'.

It should be noted that the replacement command 220 (referred to, hereinafter as a "united replacement command") is equivalent to one hundred discrete replacement commands such as Replace 206, 206';
Replace 208, 208';
. . . ;
Replace 210, 210'.

The illustrated representation forms are non-binding and other forms of representation are allowed as well. For example, when having an old pointer 218 a person versed in the art can appreciate that the following representation is allowed as well:

Replace 206';
Replace 208';
. . . ;
Replace 210'.

In a discrete replacement command, the replacing item (such as 206' or 208') are also considered as data entries.

An update package including discrete replacement commands is referred to, hereinafter, as a "discrete representation of an update package" or shortly as a "discrete update package", whereas "united representation of an update package", or shortly "united update package" refers, hereinafter, to an update package using united replacement commands. It is noted that an update package can include united and discrete replacement commands at the same time.

It should be appreciated that a united update package, as well as a discrete data package (and a combination thereof) include data entries. In the discrete update package the data entries are scattered among the commands, while in the united data package they reside in the data section.

Following the replacement command 220, the update package 201 includes a copy command for copying seventy items (i.e., the seventy terminating items 213) to follow the replaced hundred reference items in the new version 203, i.e., the seventy items (including item 211 and 212 that gives rise to items 211' and 212') shifted five items backwards in the new version 203.

Figure 2A:
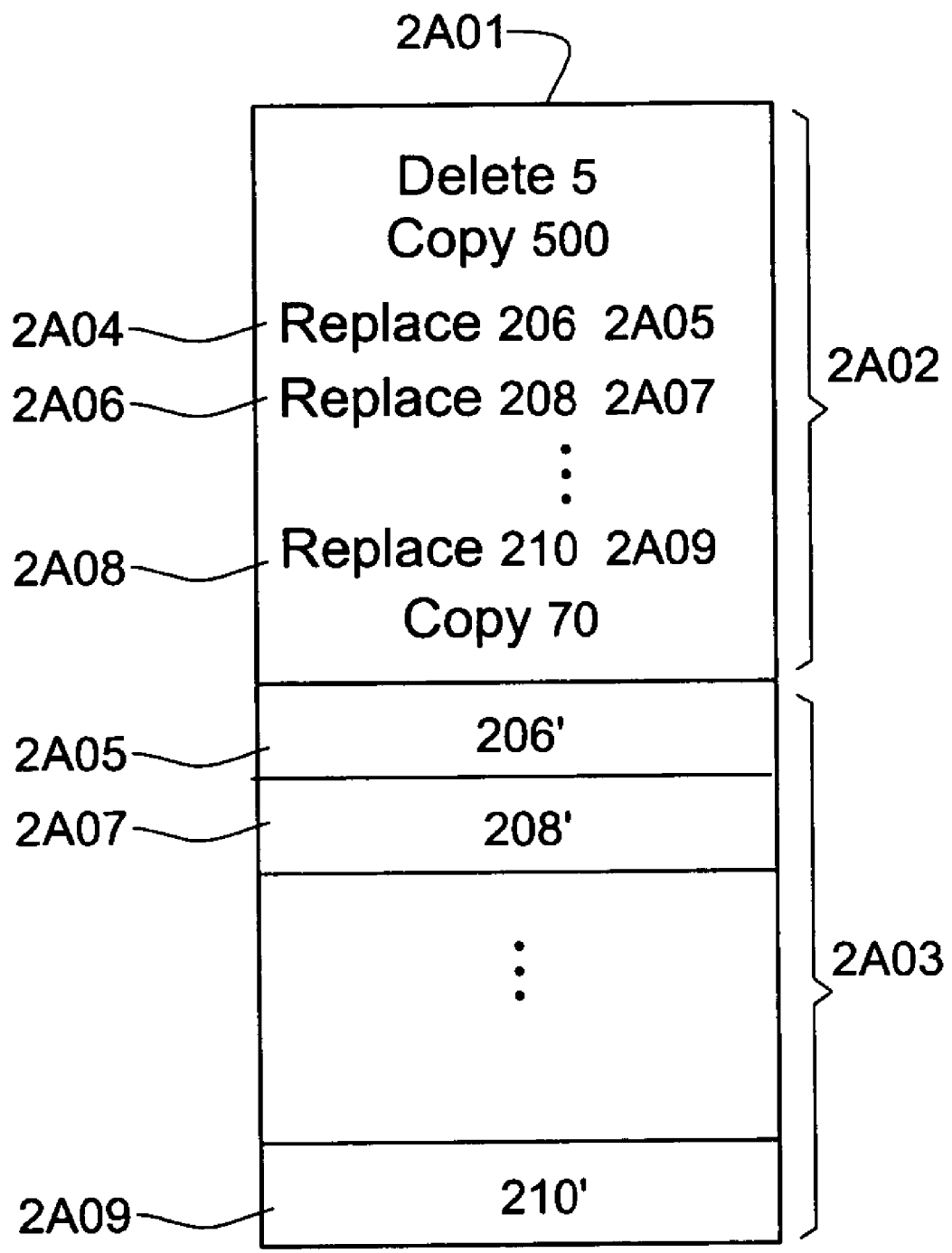
FIG. 2A illustrates schematically an alternative update package for updating the old version of FIG. 2 to a new version.

Turning now to FIG. 2A, an alternative embodiment for an update package 2A01 is illustrates schematically. The update package 2A01 is adapted to update the old version 202 of FIG. 2 to new version 203. The update package 2A01 includes discrete replacement commands, yet it includes also a commands section 2A02 and a data section 2A03. According to this embodiment, commands having associated data (such as Replace, Insert etc.) have a reference to a data entry in the data section 2A03. For example, the Replacement command 2A04, entitled at replacing 206 by 206', includes a reference to the data entry 2A05, where the replacing data (i.e., 206') is stored. In the same way, the replacement command 2A06 includes a reference to the data item 2A07 where the content of 208' is stored, and the replacement command 2A08 includes a reference to data item 2A09 where the content of 210' is stored. It can be appreciated that the update package 2A01 can be slightly larger in size compared to the update package 201, yet it renders the pointer 217 redundant.

An update package including discrete replacement commands and a commands section as well as a data section is referred to, hereinafter, as a "data distinct discrete representation update package".

It can be appreciated that if the update package is a data distinct discrete update package, non-reference items can exist between reference items, without affecting the data section of the update package (not shown in FIG. 2).

As was previously explained, the update packages 201 and 2A01 in the example above (FIGS. 2 and 2A) includes, amongst others, a hundred replacing items in the data section 215. Bearing in mind that update packages can be transferred over limited bandwidth communication lines, such as internet or mobile (cellular) networks, reducing the size of update packages would be beneficial.

Thus, unlike the existing method in the art for generating and applying update packages, the invention discloses other methods that can produce more efficient update packages or "compact update packages" as referred to hereinafter.

One embodiment for generating such efficient update packages is referred to, hereinafter, as 'a compound update package embodiment', wherein at least one conversion element is associated with a delta (or with another update package based on a delta) to form an update package. The conversion element can include, for example numeral shift rules and reference shift rules, as will be explained below. The background for explaining integer shift rules is exemplified with reference to FIGS. 3 and 4 below.

Figure 3:
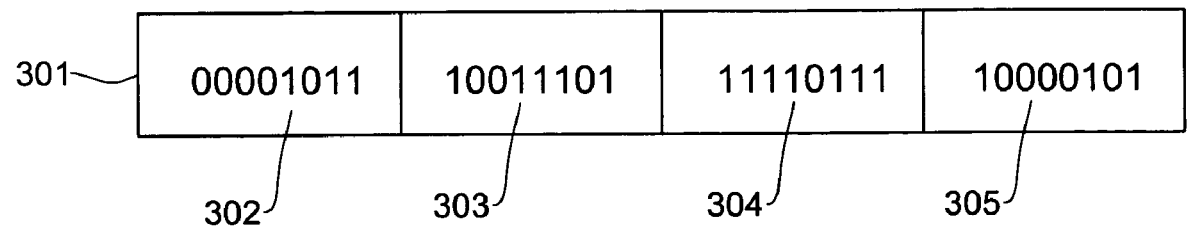
FIG. 3 is a schematic illustration of an integer value representing an item, in accordance with one embodiment of the invention.

It should be appreciated that according to some embodiments of the invention it is possible to use integer values for representing items in the old and new content (202 and 203 respectively). It can be appreciated that items are data stored on a storage device such as disk or memory. If the size of an item is four bytes, it is possible to visualize the data stored in an item as an integer number occupying the four bytes. FIG. 3 is a schematic illustration of an integer representation of a four-byte item 301, according to one embodiment of the invention. The most significant byte (left-most byte) 302 is occupied by the binary value 00001011 (0x0B in hexadecimal), the second byte 303 is occupied by the binary value 10011101 (0x9D in hexadecimal), the third 304 by the value 11110111 (0xF7 in hexadecimal) and the least significant byte 305 by the value 10000101 (0x85 in hexadecimal). The four bytes can thus be interpreted as one integer having the hexadecimal value 0x0B9DF785. That is, the integer 0x0B9DF785 is the integer representation of item 301, or int(301) as referenced hereinafter. It should be noted that 'int' stands for 'integer'.

It should be noted that any item, including non-reference items, can be represented by integers as well, and therefore int(211), for example, is the integer representation of item 211, although 211 is a non-reference item.

Reverting now to FIG. 2, the explicit reference item 206, for example, can include a program instruction "jump to the absolute address of item 207". If the absolute address of item 207 is 0x9DF785, then the instruction included in item 206 is equivalent to "jump to 0x9DF785". According to one embodiment, program instructions can be represented by predetermined op-codes. Hence, the op-code for "jump to" can be, for example, the decimal integer '11' (or 0xB in hex). As was explained before with reference to FIG. 3, the integer representation of item 206 according to this example is 0x0B9DF785. The op-code in this case is represented by byte 302, while the bytes 303, 304 and 305 are indicatives of the referenced item. That is, the bytes 303, 304 and 305 together are indicative of the referenced item, or ind(207) as referred to hereinafter. It should be noted that 'ind' stands for 'indicative'.

Alternatively, it is possible to view the whole integer as indicative of the referenced item. According to this example, if item 206 includes the instruction "jump to item 207" then the integer 0x0B9DF785 can be considered as ind(207), unlike the previous embodiment, where only 0x9DF785 was considered as the indicative value.

It should be appreciated that indicative values can be any part of (including the whole) an integer representation of an item. For example, in the old version 202 there may be another reference item (although not shown in FIG. 2) that can include an instruction such as "call item 207" wherein the op-code for the call instruction is, for example, the decimal integer 27 (or 0x1B in hex). According to this example, int (reference item) is 0x1B9DF785. If the three least significant bytes are indicative of the referenced item than ind(207) is similar to this demonstrated previously with reference to the reference item 206, that is, ind(207) is 0x9DF785. That is, according to this embodiment the same indicative of a referenced item can appear more than once in a version. However, in embodiments where the whole integer is considered as indicative of the referenced item ind(207) is 0x1B9DF785 (which is different, of course, from 0x0B9DF785). That is, according to this embodiment there can be more than one indicative value to an address of a referenced item.

In addition, the example referred to items whose size if four bytes. This size was used here (and will be used again below) only as an example, and any applicable item size can be used. Note also that representing numbers as integers is only a non limiting example and other known per se number representations are applicable.

Bearing in mind that an item (including reference items and/or non-reference items) can be represented by an integer value, and reverting back to the discrete representation of the update package 201 of FIG. 2, it is possible to express discrete replacement commands in update package 201 in terms of integers. For example, "Replace int(206), int (206')" is equivalent to "Replace 206, 206'" that is part of the discrete representation of the update package 201.

Figure 4:
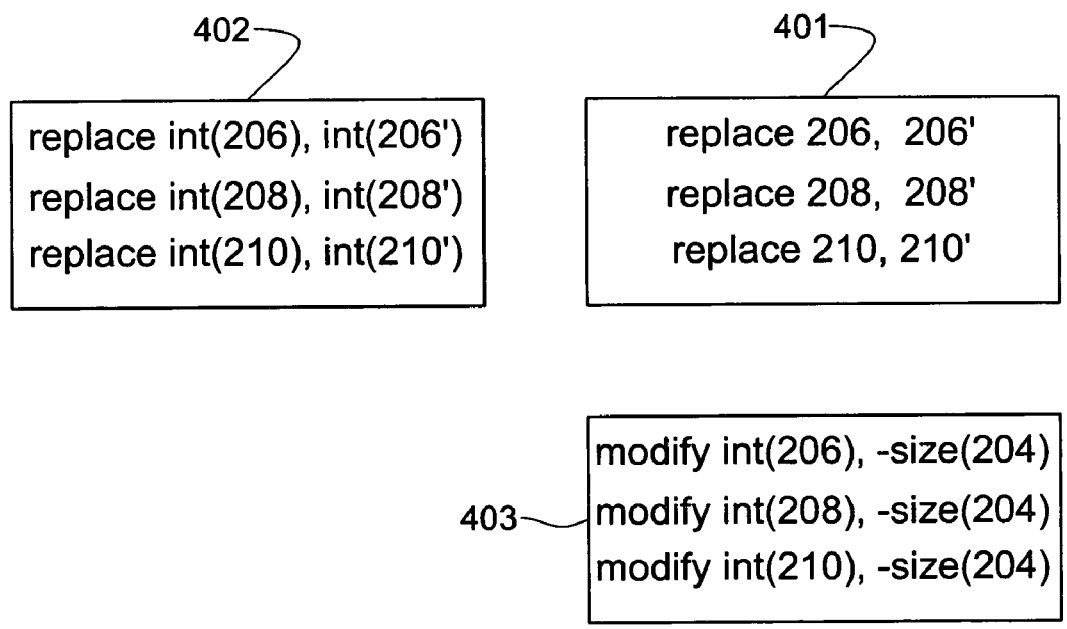
FIG. 4 illustrates a portion of the update package of FIG. 2 using integer notation, in accordance with one embodiment of the invention.

FIG. 4 illustrates a portion of the discrete representation of the update package of FIG. 2 using integer notation, according to one embodiment of the invention. Portion 401 is the portion of the update package 201 that includes discrete replacement commands. It is noted that portion 401 is in accordance with the prior art. It should be noted that any replacement command in this example is associated with two reference items, one in the old version and one in the new version. The two reference items are referred to, hereinafter, as a "replacement pair".

A person versed in the art can appreciate that 402 is equivalent to portion 401, wherein the replacement commands are expressed using the integer notation, in accordance with one embodiment of the invention. When using the integer notation, there are two integers associated with each replacement command. The two integers are referred to, hereinafter, as an "integer replacement pair". One integer in an integer replacement pair is referred to as a "pre-modification integer" (representing the item in the old version) and the second is a "post-modification integer" (representing the item in the new version).

Looking at the integer replacement pairs for the reference items in the old version 202, i.e., looking at the integer replacement pairs in 402, it is possible to see that the integer values reflect the shift of the referenced items. For example, it is possible to view the integer replacement pair <int(208), int(208')>, when items 208 and 208' references items 209 and 209' respectively. If the item 209 was originally located at address 0x9DF785, wherein the size of an item is four bytes, then after shifting the content of item 209 five items backward (i.e., 20 bytes backward) to yield item 209', this item 209' will be located at address 0x9DF771. Bearing in mind that in his example the least significant bytes of the reference item include a value indicative of the referenced item's address, it can be understood that the least significant bytes of the integer representing reference item 208 are 0x9DF785 (that is, item 208 references item 209), and the least significant bytes of the reference item 208' are 0x9DF771 (i.e., item 208' references item 209'). The difference between the two integers comprising together an integer replacement pair reflects, therefore, the shift that is performed while updating old version 202 to new version 203. This difference is referred to, hereinafter, as "modification difference". Modification difference is represented by diff together with the integer modified, such as diff(208). It can be appreciated that the description above applies also when the whole integer is considered as indicative of the referenced item.

Thus, instead of associating a pre-modification integer and a post-modification integer in an integer replacement pair, it is possible to associate a pre-modification integer or a post-modification integer with a modification difference. A pair associating a pre-modification integer together with a modification difference is referred to, hereinafter, as "integer shift pair".

Back to FIG. 4, 403 is a portion equivalent to the portions 401 and 402 that is using integer shift pairs notation.

The description with reference to FIGS. 3 and 4 provides a background for understanding an embodiment of the invention that utilizes the integer notation, hereinafter, the 'integer notation embodiment'.

Figure 5:
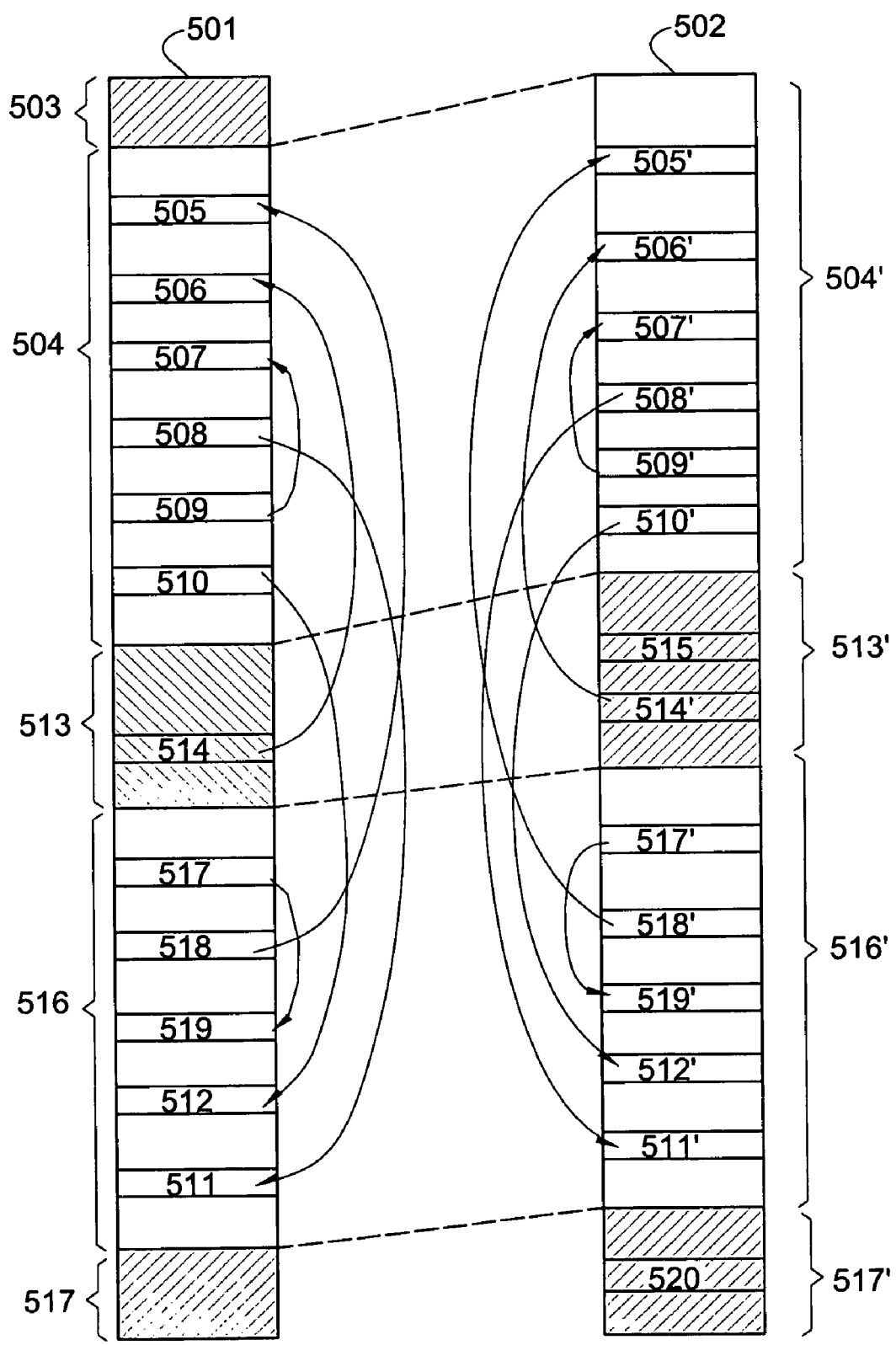
FIG. 5 is a schematic illustration of an old version and a new version received from update thereof, in accordance with one embodiment of the invention.

FIG. 5 illustrates a more complex example of old and new versions (compared to the old and new versions illustrated in FIG. 2) in order to exemplify and explain the integer notation embodiment. In the figure, an old version 501 is updated to give rise to a new version 502. Thus, the old version 501 includes a block 503, deleted while generating the new version 502. The size of the deleted block is referred to, hereinafter, as size(503). Following the example of FIG. 2, it can be understood that further to the deletion of block 503, the items in the new version are expected to be shifted backwards by size(503) items.

In the old version, block 504 follows block 503. Six items (505, 506, 507, 508, 509 and 510) are marked within block 504. The addresses where the items begin are marked, hereinafter, as addr(item), e.g., addr(505), addr(506) and addr (507) etc. The blocks 508, 509 and 510 are explicit reference items. The item 509 references item 507, and items 508, 510 reference items 511 and 512 respectively. It is noted that items 511 and 512 are part of the old version, and are located forward to block 504. Thus, the explicit reference items 508, 509 and 510, include values indicative of addr(511), addr (507) and addr(512) respectively.

In the new version 502 the block 504' corresponds to block 504. As expected, the block 504' is shifted backwards by size(503). The items 505', 506', 507', 508', 509' and 510' correspond to items 505, 506, 507, 508, 509 and 510 respectively. Like block 504', the items 505', 506', 507', 508', 509' and 510' are also shifted backwards by s size(503).

Following block 504 the old version 501 includes a block 513 having one item 514 marked therewith. The item 514 is an explicit reference item that references item 506, i.e., the reference item 514 includes a value indicative of the address addr(506). In the new version, block 513' corresponds to block 513 and item 514' corresponds to item 514. However, a new block 515 of one or more items is inserted into block 513', before item 514'. That is, size(513')>size(513). According to this example, size(515) is smaller than the size(503) and therefore it can be appreciated that item 514' is shifted backwards by (size(503)−size(515)).

Back to the old version 501, there is a third block 516 following block 513. Five items are marked within this block, specifically these are items 517, 518, 519, 511 and 512. Items 517 and 518 are explicit reference items referencing items 519 and 505, that is, items 517 and 518 include values indicative of the referenced items 519 and 505 or, in other words, indicative of addr(519) and addr(505) respectively.

In the new version, block 516' corresponds to block 516. Likewise, items 517', 518', 519', 511' and 512' correspond to items 517, 518, 519, 511 and 512 respectively. Following the insertion of block 515 to block 513' it can be appreciated that the items in clock 516' are shifted backwards by (size(503)-size(515)) items.

The example of FIG. 5 illustrates also the existence of a terminating block 517 in the old version, corresponding to block 517' in the new version. The update process inserts a new block 520 of one or more items to block 517'. According to the example the size of the new block 520 is (size(503)−size(515)), and therefore the total size of the new version 502 is substantially similar to this of the old version 501.

It should be noted that the example provided with reference to FIG. 5 is by no means binding. An old or new version of any content can be comprised by any number of blocks, each including any number of items as applicable to the case. Similarly, while updating an old version to a new version, the update process can insert, delete, replace and/or perform any required operation, as many times as required, wherein the size of items or blocks may vary, depending upon the particular application.

It should also be noted that the size of an item is non-limited as well, but hereinafter, the size of an item in the content illustrated in FIG. 5 is demonstrated as four bytes.

A person versed in the art can appreciate that for updating the old version 501 to new version 502, according to one embodiment it is possible to copy block 504 and a first portion of block 514 to the new version, insert the new block 515, and then copy the second portion of block 514 together with blocks 516 and 517 to the new version. However, as was already explained with reference to FIG. 2, doing so, the explicit reference items in the new version will reference items in their original addresses, as were in the old version. For example, in the old version the explicit reference item 508 references item 511 and therefore the least significant bytes of item 508 include a value indicative of addr(511). In the old version item 508' is located at addr(508'). After copying block 504 to the new version, it is appreciated that item 508' is located at addr(508') which is backward to addr(508) in this example. However, item 508' still includes reference to item 511, that is, it includes a value indicative of addr(511), where it is expected to include a reference to item 511' by including a value indicative of addr(511'). Therefore, according to the embodiment, after copying content from the old version to the new one and after inserting new blocks (such as block 515) the update package can include commands for replacing reference items, such as "in 508' replace the value indicative of addr(511) with a value indicative of addr(511')", or shortly, "Replace 508, 508'".

Having provided a background discussion of the integer notation embodiment (with reference to FIGS. 3 and 4 above) and exemplary old and new versions (FIG. 5), there follows a description (with reference to FIG. 6) exemplifying how to obtain a portion of the update package in accordance with the integer notation embodiment, compared with an equivalent portion of the update package obtained in accordance with the prior art. As will be evident from the description the portion obtained in accordance with this embodiment of the invention can be considerably smaller than that obtained in accordance with methods known in the prior art.

Figure 6:
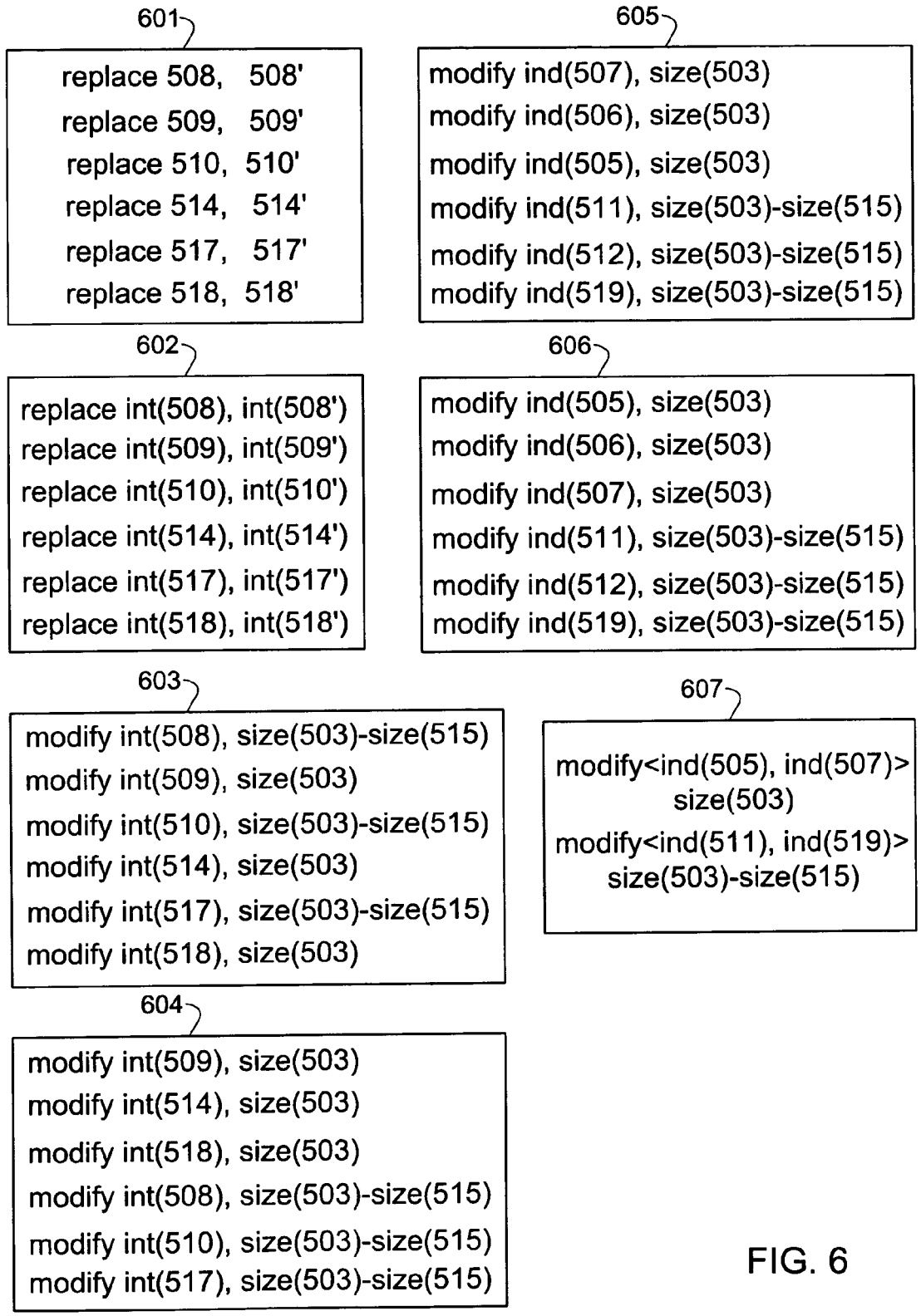
FIG. 6 illustrates a portion of the update package used to update the old version of FIG. 5 to the new version thereof.

Turning now to FIG. 6, portion 601 contains replacement instructions for updating the explicit reference items illustrated in FIG. 5. The portion 601 is a portion of the discrete representation of an update package, yet, understanding that the united and discrete representations of the update package are equivalents, the integer shift rules that will be derived below should be considered as portions of both the united and discrete representations of the update package.

It is noted that portion 601 can be generated by applying a conventional diff method on the old and new versions of FIG. 5. It is also noted that 601 is a portion of the complete update package used to update the old version 501 to the new version 502 (the complete update package is not illustrated). The portion includes only replacement commands, while other commands such as insert and/or delete are omitted. It should be noted that in the example of FIG. 5 there are six reference items, and therefore there are six replacement commands in the portion 601. Portion 602 is an equivalent portion to 601, expressed in terms of integer replacement pairs, where in light of the description of FIGS. 3 and 4 it can be understood that for a reference item the term 'int(item)' reflects the address referenced thereby.

It was further explained, with reference to FIG. 4, that instead of using integer replacement pairs' notation it is possible to express a discrete replacement command in terms of integer shift pairs. That is, instead of replacing a reference item, it is possible to modify the reference included therein, regardless of other information stored therewith such as an op-code, to reflect the shift in the referenced item's location.

From FIG. 5 it arises that the modification difference of some of the items in the example is size(503), while other items are characterized by a modification difference of (size (503)−size(515)). Therefore, it is possible to change portion 602, while instead of using replacement commands, it is possible to use modification commands using pre-modification integer shift pairs notation, as illustrated in 603.

It should be noted that the modification difference in an integer shift pair is indicative of the referenced item's shift, and not of the reference item's shift.

In 604 the same portion of the update package is illustrated, where the modification commands are sorted according to the modification differences. It should be noticed that the sorted portion 604 includes two groups. One group includes commands for modifying int(509), int(514) and int(518), wherein the modification difference is size(503). The second group includes commands for modifying int(508), int(510) and int (517), wherein the modification difference is (size(503)−size (515)).

It should be recalled that an integer or part thereof is indicative of a referenced item's address. It should also be considered that while updating a reference item the reference needs to be modified regardless of the op-code or any other information being associated with it. Therefore, in an integer shift pair, instead of referring to an integer it is possible to refer to the value indicative of the referenced item, or to 'ind(referenced item)'. A pair of ind(referenced item) and its associated modification difference is referred to, hereinafter, as an "indicative shift pair".

It should be noted that although not shown in FIGS. 5 and 6, sometimes there are more than one reference item referencing the same referenced item. If the referenced items' indicative values are part of the referencing items' integer representation, all these referencing items can sometimes be represented by a similar indicative value. If the entire integer is used as the referenced item's indicative value, there may be more than one indicative value representing the referencing items.

For example, a referenced item's address is 0x5F8B23. Four reference items reference this item by designating its address. The first has an op-code 0xA2, the second has an op-code 0x0F and the third, 0x1B. The forth reference item has an op-code similar to the first (i.e., 0xA2). If the indicative value is represented by the three least significant bytes then all four reference items will be represented as ind(0x5F8B23). On the contrary, when the whole integer is used as an indicative value, there will be three different indicative values representing the four reference items. The first and the forth reference items will be presented as ind(0xA25F8B23), the second will be represented as ind(0x0F5F8B23), and the third as ind(0x1B5F8B23).

Reverting back to FIG. 6, in 605 a sorted portion equivalent to 604 is illustrated, using the indicative shift pairs notation. 605 illustrates that when shifting reference items referencing items in block 504, the indicative values therein should be modified to reflect a shift of size(503). When shifting reference items referencing items in block 516, the indicative values therein should be modified to reflect a shift of (size (503)−size(515)).

Seeing that the two groups exist also in 605, it is possible to sort each group internally according to the ind(referenced item), and consequently generating 606. Instead of having three modification commands for modifying reference items having values indicative of items in block 504, it is possible to generate one composite modification command to update all the values indicative of items in block 504 to reflect a shift of size(503). In other words, if a reference item includes a value indicative of an item that is between 505 and 507, included, this value should be modified to reflect a shift of size(503). In the same way, instead of having three modification commands for modifying reference items having values indicative of items in block 516, it is possible to generate one composite modification command to update all the values indicative of items in block 516 to reflect a shift of (size(503)−size(515)). In other words, if a reference item includes a value indicative of an item that is between 511 and 519, included, this value should be modified to reflect a shift of (size(503)−size(515)), as illustrated in 607. Such a composite modification command is referenced, hereinafter, as an integer shift rule. That is, 607 demonstrates two integer shift rules that can be applied in order to update the explicit reference items in the example of FIG. 5.

Thus, it can be appreciated that the portion 607, using integer shift rules is equivalent to portion 601, using replacement commands. Yet, portion 607 includes only two integer shift rules, instead of six replacement commands that are included in 601. Hence the update package including portion 607 is equivalent to an update package including portion 601. If the space required for storing an integer shift rule is smaller than the space required for storing its equivalent replacement commands, it is possible to reduce the size of an update package by using the equivalent integer shift rule. In addition, the illustrated shift rules can be combined also in the united representation of the update package, rendering at least part of the entries in the data section of this update package redundant, and therefore reducing the update package's size.

The reduction in the update package size can be significant. Considering, for example, a non limiting application of updating version of software on cellular telephones, an integer shift rule can sometimes save even tens of thousands replacement commands.

It should also be noted that instead of using integer shift rules, any numeral shift rule can apply as well, therefore, hereinafter, the term 'numeral shift rule' is used.

Figure 7:
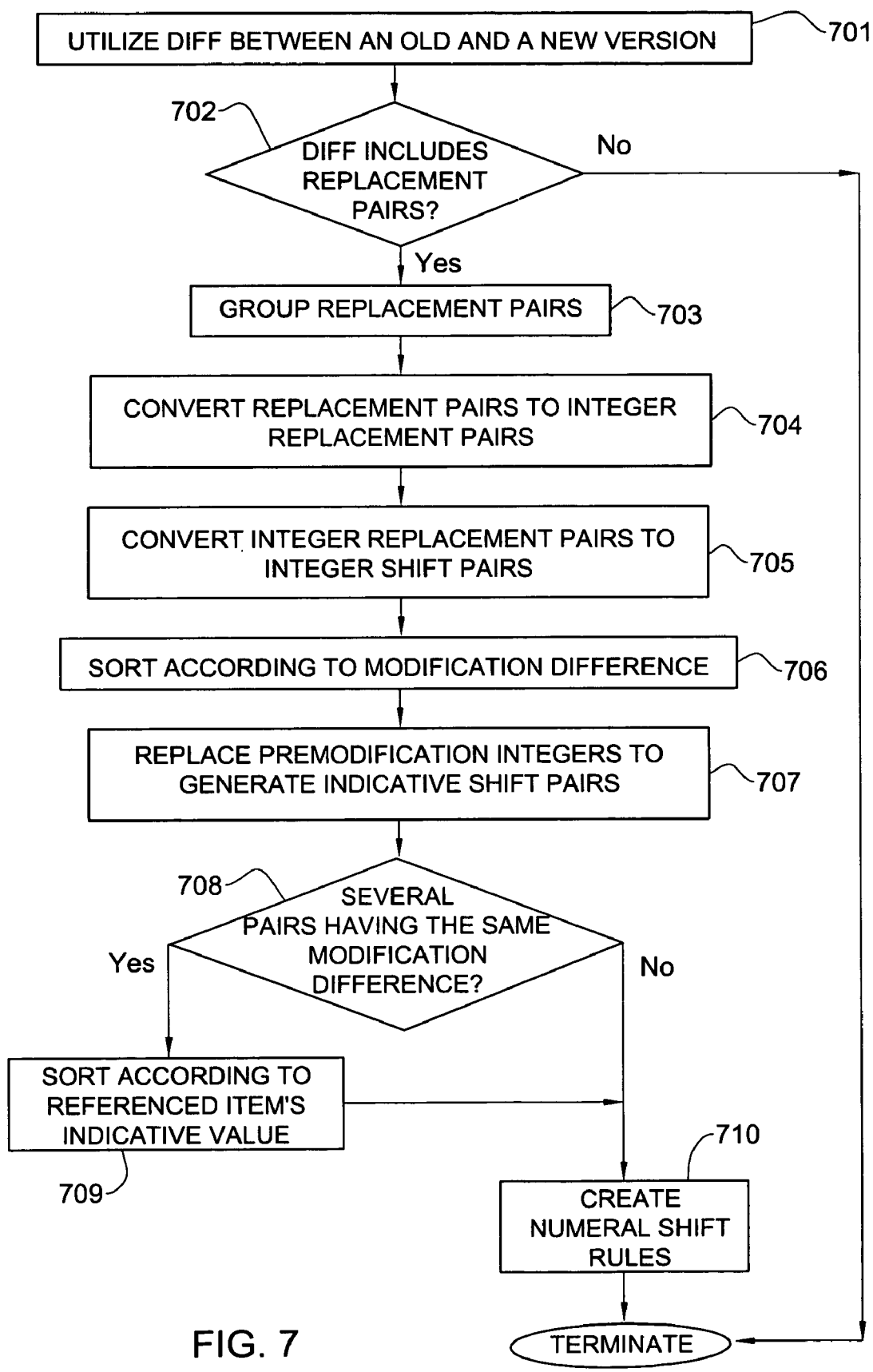
FIG. 7 is a flowchart describing in detail the generation of numeral shift rules in an update package, in accordance with one embodiment of the invention.

FIG. 7 is a flowchart describing in detail the generation of numeral shift rules in an update package, in accordance with one embodiment of the invention. It should be appreciated that in order to create an update package and numeral shift rules, a diff should be generated (701, in any method known per se, using a diff tool) between an old version and a new version in order to detect differences between the two versions. The diff tool generates list of differences between the old and new versions, amongst can be replacement pairs. For example the diff tool can generate a list of update commands and their associated data entries. If the diff includes replacement pairs (702), at least some of them are grouped together (703) to form a portion of the diff, thus creating, for example, a portion like the portion 601 of FIG. 6. Next (704), the replacement pairs are converted to form integer replacement pairs, using the integer notation as was exemplified before with reference to FIGS. 4 and 6 (see 402 and 602 therein).

After converting the replacement pairs to integer replacement pairs the integer replacement pairs are converted (705) to be integer shift pairs, by associating the pre-modification integers together with their respective modification difference, a stage that was previously exemplified with reference to FIGS. 4 (e.g., see 403) and 6 (see 603). The integer shift pairs are sorted (706) according to the modification differences as in FIG. 6, block 604.

After sorting, the pre-modification integers in the integer shift pairs are replaced (707) by the respective referenced items' indicative values to form indicative shift pairs, a stage exemplified before with reference to FIG. 6 (see 605). In those cases when the whole integer is considered as the referenced items' indicative value, it is appreciated that the block 707 is redundant and can be skipped, while the int value serves instead of the ind throughout the rules' generation process. It should be noted that in those cases when there are several indicative shift pairs having the same modification difference(708), these indicative shift pairs are sorted (709) in accordance with their indicative value, as was illustrated before, e.g., in FIG. 6 (see 606).

If there are groups including more than one indicative shift pairs having the same modification difference, the indicative shift pairs in a group can be joined (710) to form a numeral shift rule indicating the first and last referenced items' indicative values in the group and the modification difference characterizing them, as was previously exemplified with reference to FIG. 6 (see 607).

It is noted that sometimes further optimizations are applicable. For example, if there are two numeral shift rules having the same modification difference, wherein the last referenced item's indicative value of the first rule and the first referenced item's indicative value of the second rule are close enough, the two rules can be joined to form one joined numeral shift rule. The joined numeral shift rule indicates the first referenced items' indicative value of the first numeral shift rule and the last referenced items' indicative value of the second numeral shift rule, together with the modification difference that characterizes them. It should be noted that when two non-adjusting numeral shift rules are joined, the numeral shift rule (or indicative shift pairs) between them are swallowed by the joined rule, and therefore their pre-modification reference items are susceptible to erroneous update (that is, they may be updated to reflect an erroneous shift).

It should be noted that the invention is not bound to the specific sequence of operation and manner of obtaining the numeral shift rules as described in FIG. 7, or to the numeral shift rule terminology used in portion 607 of FIG. 6. For example, another embodiment can skip converting the replacement pairs to integer replacement pairs (as suggested by 704). Instead this embodiment can convert the replacement pairs directly to integer shift pairs.

In addition, the embodiments illustrated so far reduce the size of an update package by using numeral shift rules, thus generating a compact update package. It is noted that a compact update package could be named also, e.g., "compact difference results".

According to a different embodiment, sometimes content can be accompanied by associated descriptive data referred to, hereinafter, as 'meta-data'. The descriptive data is referred to, hereinafter, as "content description data". Common forms for providing meta-data are symbol tables, debug tables and linker maps (sometimes referred to as map files) used to describe computer programs. However, meta-data is not limited to computer programs and other types of content can have meta-data as well. It should also be noted that associated meta-data can be separated from the content, for example by storing it in a different file or by storing it in a database. Alternatively, the meta-data can be stored as part of the content, as applicable to the case.

Figure 8:
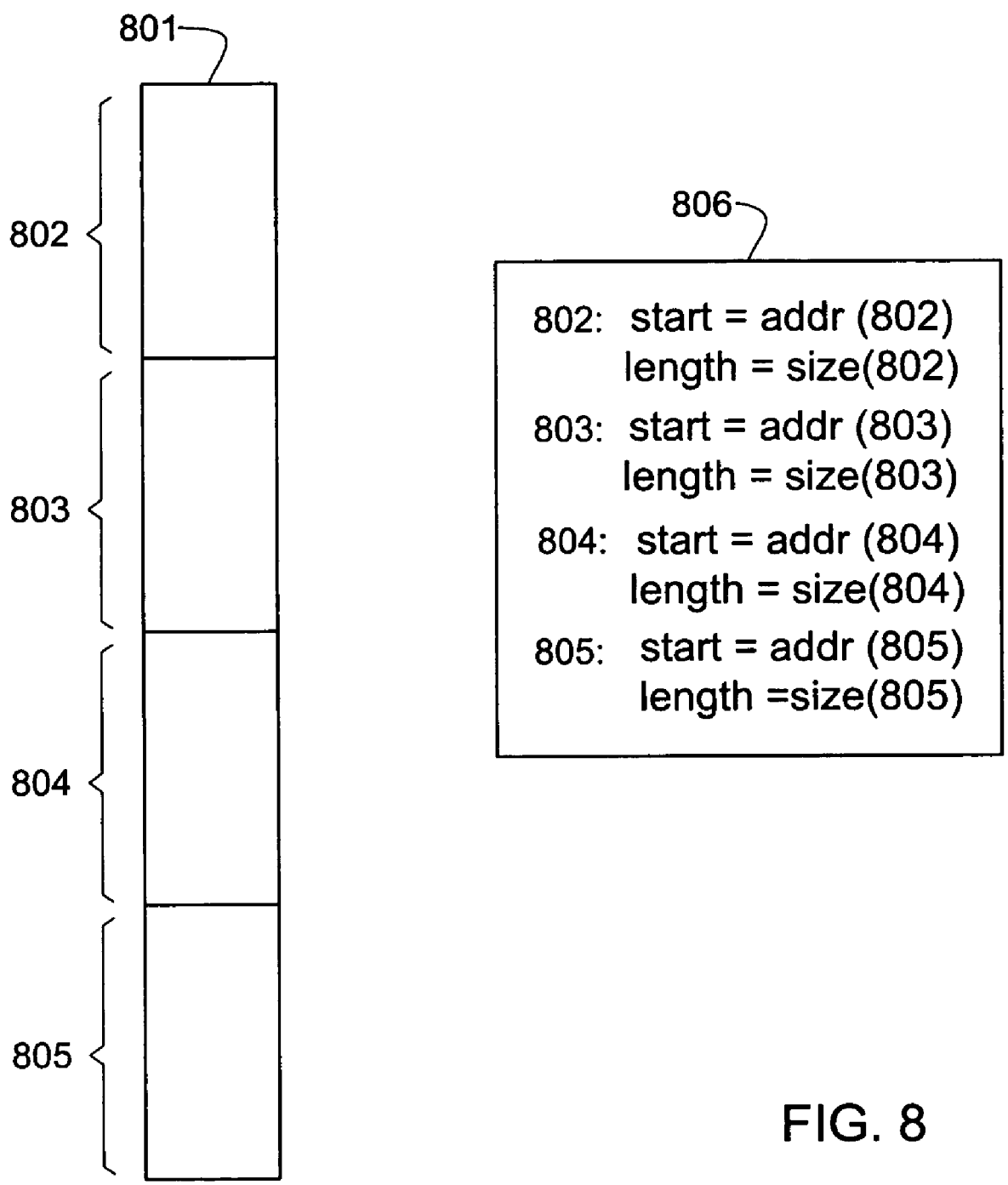
FIG. 8 illustrates exemplary content and associated meta-data, in accordance with one embodiment of the invention.

FIG. 8 illustrates exemplary content and associated meta-data. Content 801 includes four blocks 802, 803, 804 and 805. Block 803 starts at addr(803), which is the start address of block 803, block 804 starts at addr(804), and block 805 starts at addr(805). The associated meta-data 806 describes the content and the blocks thereof, wherein for each block the meta-data 806 provides a start address and the length of the block. It should be notified, however, that this is a non-limiting example and meta-data can include other data instead of the start address and length of each block.

When generating an update package intended to update an old version of content to a new version thereof, if meta-data is associated with the content, it is possible to use the meta-data in order to encode modifications to references as will be explained below with reference to FIGS. 9 and 10.

The example and description of FIG. 8 will serve as a basis for understanding how to obtain a so called 'reference shift rule' in accordance with another embodiment of the invention, as will be explained with further detail with reference to FIG. 9, and FIG. 10. FIG. 9 is a schematic illustration of an old version 901 and a new version 902 received from update thereof. Meta-data can be associated with the old and new versions of FIG. 9. FIG. 10 illustrates a difference table 1001 and a portion of an update package 1002, in accordance with one embodiment of the invention.

Figure 9:
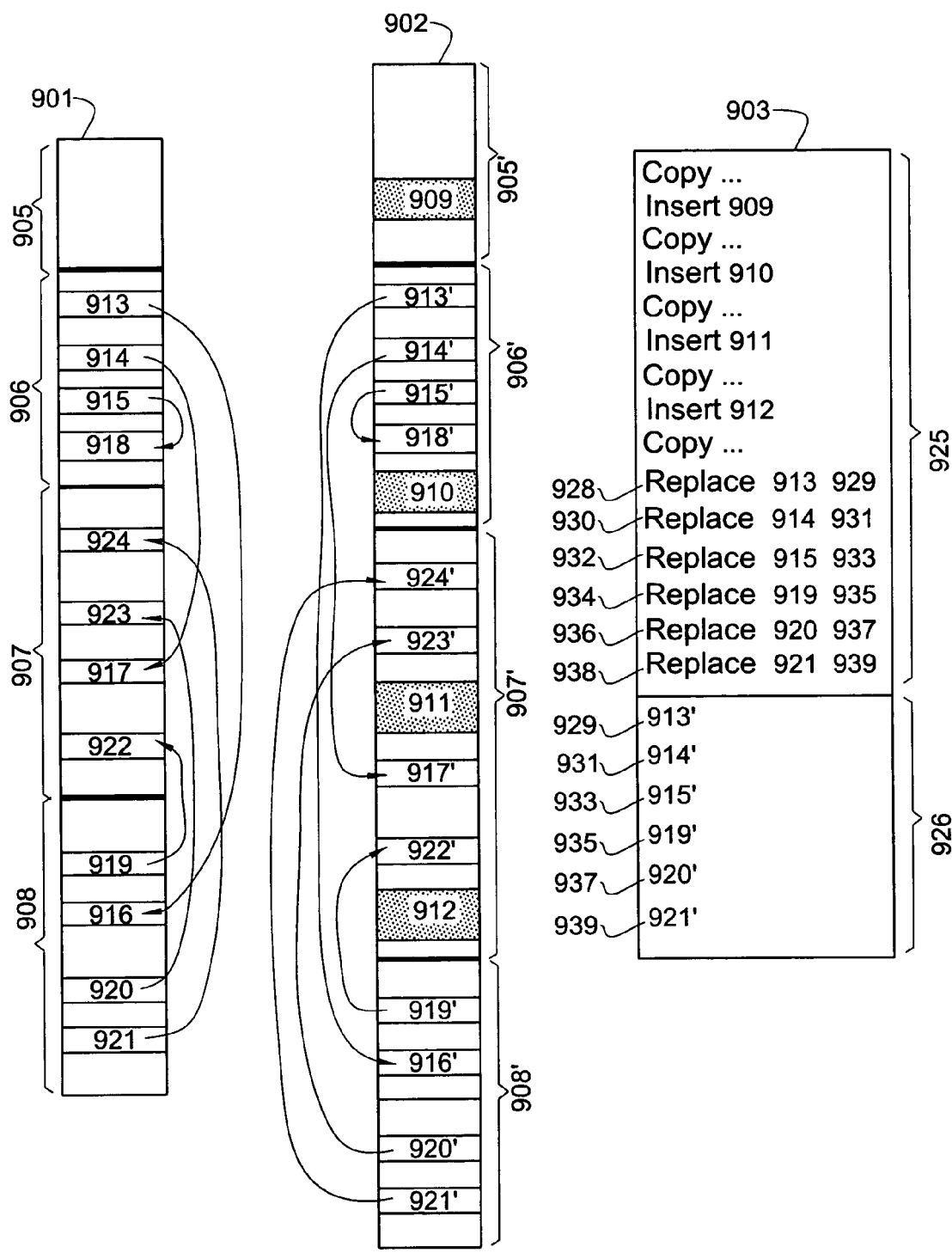
FIG. 9 is a schematic illustration of an old version and a new version received from update thereof, in accordance with one embodiment of the invention.

In FIG. 9, the update package 903 is a "data distinct discrete representation update package capable of updating the old version 901 to the new version 902. The update package 903 will be described in detail below.

The old version 901 includes four blocks (905, 906, 907 and 708), their respective start addresses are addr(905), addr(906), addr(907) and addr(908). In the new version, a new block 909 of at least one item was added to block 905, thus generating the corresponding block 905'. It can be appreciated that the size of block 905' is thus bigger than the size of the block 905 by size(909). In addition, unless additional insertions of items to the content or deletions of items from the content further occur during the update process, items following the new block 909 are expected to shift forward by size(909).

Forward to block 905', block 906' corresponds to block 906, block 907' corresponds to block 907 and block 908' corresponds to block 708. A new block 910 of one or more items, whose size is size(910), is inserted also into block 906', thus, items following the new item 910 are shifted forward by (size(909)+size(910)). In addition, a new block 911, whose size is size(911) is inserted somewhere along block 907' and another new block 912 of one or more items, whose size is size(912) is inserted also into the same block (907'). Thus, items following the new item 912 are shifted forward by (size(909)+size(910)+size(911)+size(912)).

In the old version, block 906 includes at least three explicit reference items 913, 914 and 915, referencing items 916, 917 and 918 correspondingly. The referenced item 916 is in block 908, the referenced item 917 is in block 907, and the referenced item 918 is in block 906.

In addition, block 908 in the old version includes at least three explicit reference items 919, 920 and 921 that reference items 922, 923 and 924 correspondingly. Like the referenced item 917, the referenced items 922, 923 and 924 are also in block 907.

In the new version, the items 913', 914', 915', 916', 917', 918', 919', 920', 921', 922', 923' and 924' correspond to items 913, 914, 915, 916, 917, 918, 919, 920, 921, 922, 923 and 924 in the old version.

In addition, it was previously mentioned that 903 is an optional data distinct discrete representation update package capable of updating the old version 901 to the new version 902. As was previously explained with reference to FIG. 2A (see 2A01), the update package includes a commands section (925) and a data section (926). The replacement command 928 replaces the content of the reference item corresponding to 913 in the old version with the content of data entry 929, i.e., with the content of 913'. In the same way, replacement command 930 replaces the content of reference item corresponding to 914 with 914', as stored in 931 and so on. It can be appreciated that the update package 903 is an equivalent to a delta, and therefore the update package 903 is considered here as delta.

Whereas the description how to obtain reference shift rules will be described below with respect to the specific example of FIG. 9, it should be noted, incidentally, that the example of FIGS. 9 and 10 is non-limiting. The old and new versions can have any applicable number of blocks, new blocks and items can be inserted at any location or deleted while updating the old version to a new version.

The meta-data in association with the old version 901 describes the four blocks, their respective start address and their length. The meta-data in association with the new version 902 describes the blocks included therein. By comparing meta-data associated with the old version with meta-data associated with the new version it can be demonstrated that the start address of block 905' in this case is similar to this of block 905 of the oldn version. However, the start address of block 906' equals (addr(906)+size(909)). In addition, the start address of block 907', when compared to the start address of block 907 of the old version reflects a shift of size(909) and size (910), that is, addr(907')=addr(907)+size(909)+size(910). The start address of block 908' demonstrates an accumulative shift of size(909), size(910), size(911) and size (912), that is, addr(908')=addr(908)+size(909)+size(910)+size(911)+size(912).

It should also be noted that it is possible to describe the meta-data of the new version by using addresses in the old version, and adding the sizes of the inserted blocks when applicable. The result, together with the modificationn difference (that is, the shift that characterizes the start address of each block in the old version and its corresponding block in the new version) is referred to as a "difference tables". This is illustrated in 1001 (see FIG. 10), which is the difference table corresponding to the meta-data associated with the old and new versions.

The difference table 1001 includes at least information about blocks (such as their start addresses) in the old version associated with information about their respective corresponding blocks (such as their start addresses) in the new version. Alternatively, the difference table can include at least information about blocks in the old version associated with information about their respective modification differences (i.e., their shift value). It is noted that other alternatives are allowed as well, such as including at least information about blocks in the new version associated with information about their respective modification differences.

It can be appreciated that reference shift rules can be generated in accordance with the difference table 1001. If a reference item references another item in block 906 for example, following the information in the difference table, it is possible to appreciate that in the new version its corresponding reference item should be modified to reflect a shift of size(909) in the referenced items location. In the same way if a second reference item references another item in block 908, it is possible to appreciate that in the new version its corresponding reference item should be modified to reflect a shift of size(909)+size(910)+size(911)+size(912) in the referenced items location.

Generally speaking, the difference table reflects therefore reference shift rules. For example, for each referenced item in block 906' the characteristic shift is size(909). In the same way for each referenced item in block 907' the characteristic shift is size (909)+size(910) whereas for each referenced item in block 908' the characteristic shift is size(909)+size(910)+size(911)+size(912).

It is possible to determine whether a reference item references another item in a certain block in accordance with the blocks' start address and length as indicated in the difference table. Therefore a reference shift rule may be represented by the exemplary notation "Modify <addr(referenced block), size(referenced block)>, shift".

If there are two neighboring blocks that are characterized by the same shift (in FIG. 9 blocks 905 and 906, for example are neighboring blocks, as well as blocks 906 and 907 or blocks 907 and 908, but there are no neighboring blocks that are characterized by the same shift)-, it will be appreciated that their two reference shift rules can be joined to form one reference shift rule.

In FIG. 10, block 1002 exemplifies the reference shift rules based on the difference table 1001. In this case four reference shift rules (1003, 1004, 1005 and 1006) are illustrated.

Yet, it can be appreciated that some of the reference shift rules are erroneous. For example, the reference shift rule 1005 predicts that reference 917' is shifted by size(909)+size(910). Item 914' that references item 917' may be modified accordingly. Yet, it can be appreciated that item 917' is actually shifted by size(909)+size(910)+size(911), and this is the actual modification that should be applied to item 914'. In addition, sometimes, as is known per se, the meta-data does not describe one or more blocks of the content. See for example, FIGS. 9 and 11. In FIG. 11, an alternative meta-data 1101 of the old version 901 of FIG. 9 and an alternative meta-data 1102 of the new version 902 of FIG. 9 are illustrated. It is noted that the meta-data 1101 and 1102 are partial, that is, block 907 and its corresponding block 907' are not described. It can be appreciated therefore, that in the difference table 1201 of FIG. 12, the differences for block 907' are not described as well. This affects the generation of reference shift rules illustrated in a portion of an update package 1202. Because block 907' is not described, the portion 1202 illustrates only three reference shift rules 1203, 1204 and 1205. Therefore, a reference item referencing another item in block 907' cannot be modified in accordance with the reference shift rules in this case.

Figure 12:
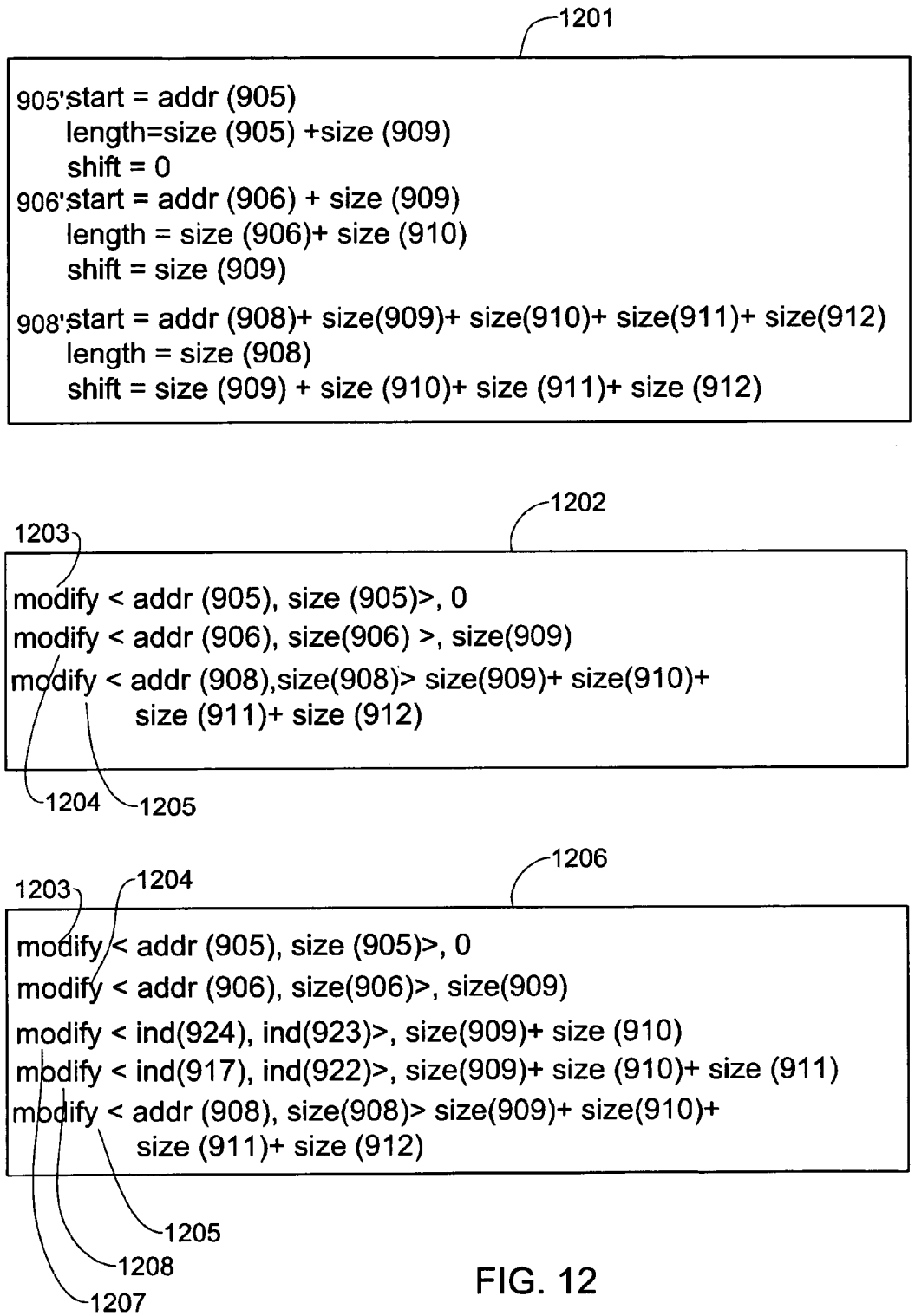
FIG. 12 illustrates a difference table and its corresponding reference shift rules in accordance with the example of FIGS. 9 and 11, according to an embodiment of the invention.

Following the example of FIG. 10 (1002), where an erroneous reference shift rule (1005) is generated, and the example of FIGS. 11 and 12, where one block is not described (see 1202), and following the description of the numeral shift rules with reference to FIGS. 5, 6 and 7 above, a person versed in the art can appreciate that it is possible to try and apply numeral shift rules wherever reference shift rules are non applicable. As it may be recalled, the method for utilizing numeral shift rules does not require meta-data and therefore utilizing numeral shift rules is applicable in this case.

1206 is a portion of an update package that illustrates a combination of reference shift rules (1203, 1204 and 1205) and numeral shift rules (1207 and 1208).

Figure 13:
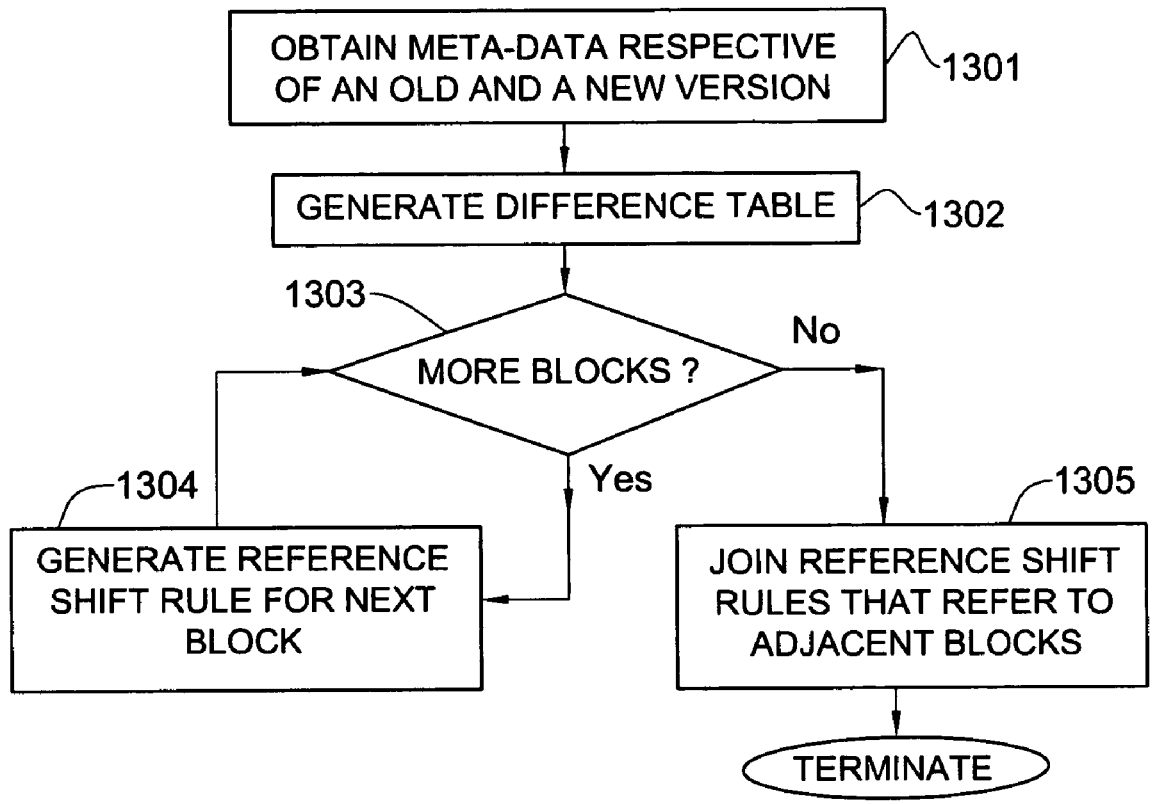
FIG. 13 is a flowchart describing in detail the generation of reference shift rules in an update package, in accordance with one embodiment of the invention.

FIG. 13 is a flowchart describing in detail the generation of reference shift rules in an update package, in accordance with one embodiment of the invention. After obtaining (1301) meta-data respective of an old and a new version, a difference table (such as difference table 1001 of FIG. 10) is generated (1302).

For each block (1303) described in the difference table a reference shift rule is being generated (1304). Next reference shift rules referring to adjacent blocks are joined (1305) if their difference values are equal. It should be noted that the invention is not bound to the specific sequence of operation and manner of obtaining the reference shift rules as described in FIG. 13.

It should also be noted that the notation used to describe a reference shift rules is non binding and other notations are applicable as well. For example, instead of designating the first item and the length of the block or blocks covered by the rule (in other words, a "section"), it is possible to designate the first and the last items in the section. Note that the latter applies also to numeral shift rules described with reference to FIG. 7, mutatis mutandis.

The description above describes embodiments for generating numeral and reference shift rules for updating references in reference items during update of an old version to a new version. It should be noted that the invention is not bound by the specific numeral shift rules and reference shift rules described above. More generally, the term "shift rule" refers to updating of reference items to reflect the shift of referenced items in the new version.

Hereinafter, a 'conversion element' is the term used to refer to a collection of shift rules associated with an update package. That is, a conversion element can include at least one numeral shift rule, and/or at least one reference shift rule, and/or any other shift rule that can be applied while updating an old version to a new version. Thus, according to the description above, a person versed in the art can appreciate that an update package that contains at least one conversion element is a compact update package.

After explaining what is a conversion element and illustrating different embodiments for generation thereof, and reverting back to the example of FIGS. 9, 10 and 12 (mainly the update package 903 and the conversion element 1002), another embodiment is illustrated for generating a small update package.

By obtaining the update package 903 it can be appreciated that for each data entry (929, 931, 933, 935, 937 and 939) it is possible to associate a corresponding item in the old version 901 (913, 914, 915, 919, 920 and 921 correspondingly). It can also be appreciated that when the conversion element is obtained, it can be applied to an element in the old version while the output generated is expected to predict (i.e., be similar to) the corresponding item in the new version, unless the conversion element includes an erroneous rule (such as rule 1005 in FIG. 10), or unless the element is not covered by the conversion element (such as the conversion element 1202 in FIG. 12, where the block 907 is not covered). The output of applying a conversion element to an item in the old version is referred to, hereinafter, as "converted old item", marked as COI(item). It is noted that COI stands for Converted Old Item. It is appreciated that in light of the description FIG. 3 above, COI(item) can also be viewed as an integer.

Figure 14:
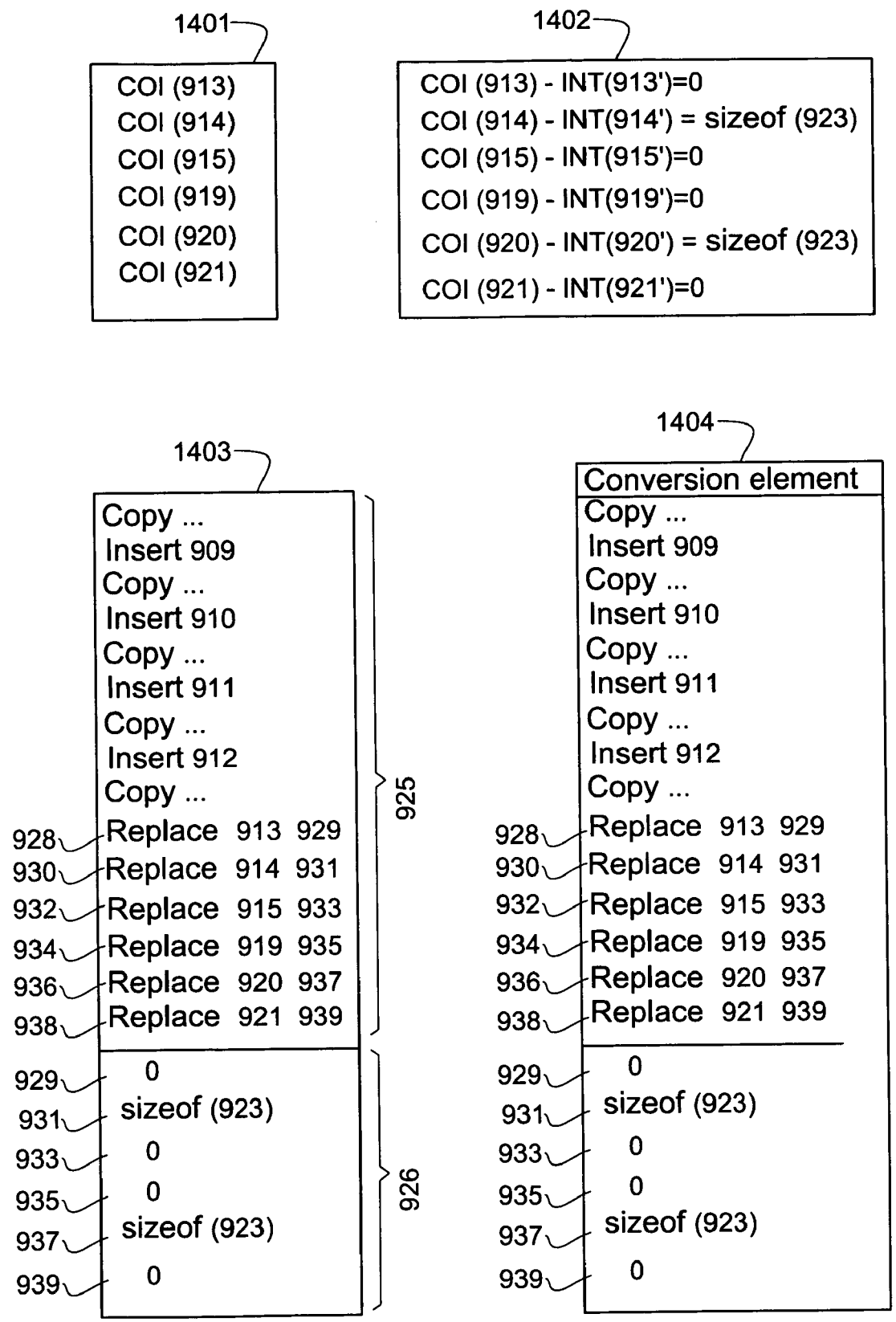
FIG. 14 is a schematic illustration of generating a small update package for the update package illustrated in FIG. 9, in accordance with one embodiment of the invention.

FIG. 14 is a schematic illustration of generating a small update package for the update package illustrated in FIG. 9, in accordance with one embodiment of the invention; Thus, by obtaining the old and new versions (901 and 902), a delta (903) and a conversion element (1002), and by applying the conversion element to the items 913, 914, 915, 919, 920 and 921 of the old version, the corresponding converted old items illustrated in 1401 are generated. Remembering that the old items 913, 914, 915, 919, 920 and 921 correspond to the data entries in the data section 926 (i.e., data entries 929, 931, 933, 935, 937 and 939), it can be appreciated that the converted old elements COI (913), COI(914), COI(915), COI(919), COI (920) and COI(921) also correspond to the data entries in the data section 926. It can be further appreciated that these converted old items correspond, therefore, to the replacing items (or in other words, to the corresponding items in the new version) 913', 914', 915', 919', 920' and 921'.

In cases when the conversion element is not erroneous, the converted old items generated are expected to be substantially similar to their corresponding items in the new version. Therefore, when subtracting an integer representing the content of the replacing item from the respective converted old item, the expected difference is zero. In addition, in those cases when the conversion element is erroneous, the difference will be smaller or larger than zero. The difference is therefore an indicative to the measure of accuracy of the conversion element, and therefore it is referred to, hereinafter, as a "distance".

More accurately, the distance reflects the deviation of the converted old item from its corresponding items in the new version. This is illustrated in 1402, where the converted old items COI(914) and COI(920) deviate from their corresponding items in the new version, while the other converted old items are substantially similar to their corresponding items in the new version, and therefore the distance is zero. It can be appreciated that the deviation of COI(914) and COI(920) reflects the error created by the erroneous reference shift rule 1005 in the conversion element 1002.

Knowing that in a three variables equation, when two variables are known the third variable is assessable as well, wherein the old items are known (and therefore also their corresponding converted old items) as well as the distance, it is appreciated that the corresponding items in the new version, or the replacing items, are assessable. Therefore, according to the illustrated embodiment, the distances can replace the content of the replacing items in the data section of the delta, as illustrated in 1403 (FIG. 14).

It is appreciated that in many cases the distance is much smaller in value than the integer of the corresponding items in the new version. While typical data entry including content of corresponding items in the new version can occupy four bytes, and sometimes even more, it can be shown that if the value of the distance is smaller than 256, one byte is enough for storing thereof. Therefore, it can be appreciated that the delta 1403 is smaller in size than the equivalent delta 903. Therefore, a delta including distances in the data section is referred to, hereinafter, as a "small delta". Yet, in order to generate an applicable update package, the conversion element needs to be associated with the small delta, generating together a "small update package".

It is known per se that a collection of values characterized by a small variability can be better compressed using known per se compressing tools and techniques, such as zip. It can be appreciated therefore that a small delta, as well as a small update package can be further compressed to form a "compressed delta" or "compressed update package", correspondingly. The compressed delta is potentially smaller in size than its corresponding small delta. Similarly, the compressed update package is potentially smaller in size than its corresponding small update package. Yet, it should be appreciated that the compressed delta is considered as one form of a small delta. Similarly, a compressed update package can be considered as one form as a small update package.

It should be noted that instead of computing a distance by subtracting the integer representing the content of the replacing item from the converted old item, other manipulations can be done as well. For example, the distance can be computed by subtracting the converted old item from the integer representing the content of the replacing item. Alternatively, it is possible apply bit-wise XOR. Therefore, the term "distance" is not limited to a difference. In addition, the term "modified data entry" is used hereinafter to describe an entry in the data section that represents a distance. A modified data entry is based on the corresponding converted old items and data entry.

It should be appreciated that some inserted items, and therefore some data entries, have no corresponding items in the old version. For example, when inserting one or more blocks to a new version the command (in the commands section) is "Insert", wherein the command can point to a data entry in the data section. The content stored in the data entry has no corresponding item in the old version. In this case, no modified data entry will be generated therefore, and the small delta will include the inserted data entry without modification.

In those cases when there are modified and unmodified data entries in a small delta, it is possible to reorganize their order in a way forming two successive groups. One group includes modified data entries, and therefore its size can be reduced and it can be compressed efficiently, wherein the other group includes data entries (that is, unmodified data entries). Applying this embodiment, when grouping data entries in a delta, it is required to update the references included in the commands, to reflect the data entries' new position (following the grouping).

Figure 15:
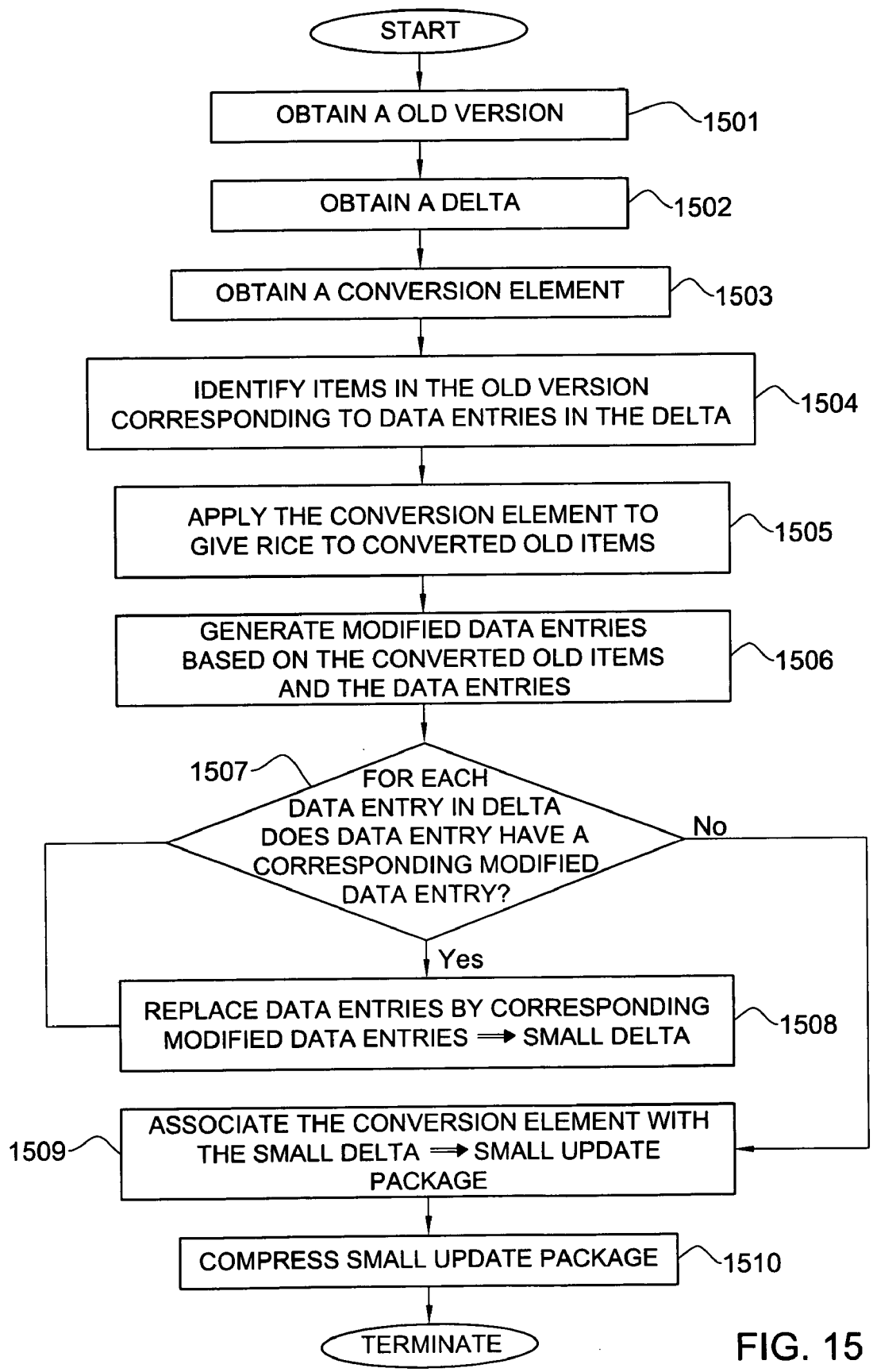
FIG. 15 is a flowchart describing in detail the generation of a small update package, in accordance with one embodiment of the invention.

FIG. 15 is a flowchart describing in detail the generation of a small update package and a compressed update package, in accordance with one embodiment of the invention. In order to generate a small update package, an old version is obtained (1501). In addition, a delta and a conversion element are obtained as well (1502 and 1503, correspondingly). It is noted that by specifying here that the delta and conversion elements are obtained, a person versed in the art can appreciate that at least one of the delta and the conversion element can be obtained from an external source (for example: stored in a storage device and retrieved for the purpose of a small update package generation). Alternatively, at least one of them can be generated, for example, by one of the embodiments previously described above, and used for the small update package generation.

Items in the old version, that correspond to data entries in the delta are identified (1504), and the conversion element is applied (1505) to them, giving rise to converted old items. The old converted items and their corresponding data entries are used for generating (1506) corresponding modified data entries, for example, by computing their distance, as was previously explained with reference to FIG. 14. The content of the data entries in the delta, for whom modified data entries were computed (see 1507) are replaced (1508) by their corresponding modified data entries, generating a small delta thereby.

After generating a small delta, it is being associated (1509) with the conversion element, giving rise to a small update package. It should be noted that sometimes association means that the small update package includes the conversion element and the small delta. Alternatively, the small update package can include, for example, a small delta and a reference identifying a conversion element. In this case, when the small update package is applied for updating an old version of content to a new version thereof (as will be explained in detail below), the referenced conversion element needs to be accessible to the update process. Similarly, the small update package can associate a conversion element together with a reference to a delta, or even two references, one to a delta and one to an update package, as applicable to the case.

Alternatively, the small update package can be compressed (1510), thus generating a compressed update package. As was previously mentioned, a compressed update package is also considered as a small update package. When generating a compressed update package it is possible to compress a small update package associating a small delta and a conversion element. Alternatively, it is possible to generate a compressed update package by compressing a small delta and associating the respective conversion element therewith.

In addition, it should be noted that the generated small update package can be outputted, for example by transmitting it to remote (wired or wireless) storage devices and/or to devices coupled therewith (see, for example the cellular telephones 102 in FIG. 1). Alternatively, the small update package can be outputted to storage device and stored therein.

While so far embodiments for generating small update packages were described, the exemplary embodiment described below with reference to FIG. 16 describes how an old version of content can be updated using a small update package.

After obtaining access (1601) to an old version and obtaining (1602) a small update package, and after uncompressing (1603) the small update package (if required), a conversion element and a small delta are extracted (1604) from the small update package. It is appreciated that the small delta includes modified data entries. In the old version, items corresponding to the modified data entries are identified (1605) and their corresponding converted old items are generated (1606) by applying the conversion element thereto.

It is noted though that obtaining can include inputting. For example, it the update process is executed in a remote storage device, such as a storage device coupled to a cellular telephone (see FIG. 1), the update package is first received at the storage device. Other input firms are, for example, reading the small update package from a storage device.

It was previously explained with reference to FIG. 14 that the generation of a modified data entry is reversible, that is, having a modified old item and a data entry, a modified data entry can be generated and vice versa: having a modified data entry and a modified old item, a data entry can be generated. Thus, based on the modified data entries and on the converted old items, corresponding data entries are generated (1607), and replaced (1608) with the modified data entries in the small delta. Thus a delta is generated.

The delta is applied (1609) to the old version, for updating it to generate a new version, in a method known per se. Alternatively, the delta can be associated with the conversion element to form an update package. The update package can be applied for updating the old version to a new version, instead of the delta.

It can be appreciated that alternative embodiments exist as well. For example, it is possible to generate the data entries while updating the version. That way, the update process executes commands stored in the small delta, and when it accesses a modified data entry in the data section of the small update package, it generates the corresponding converted old item (using the conversion element and applying it to the corresponding item in the old version), generates the data entry, and then applies it to the new version.

Figure 17:
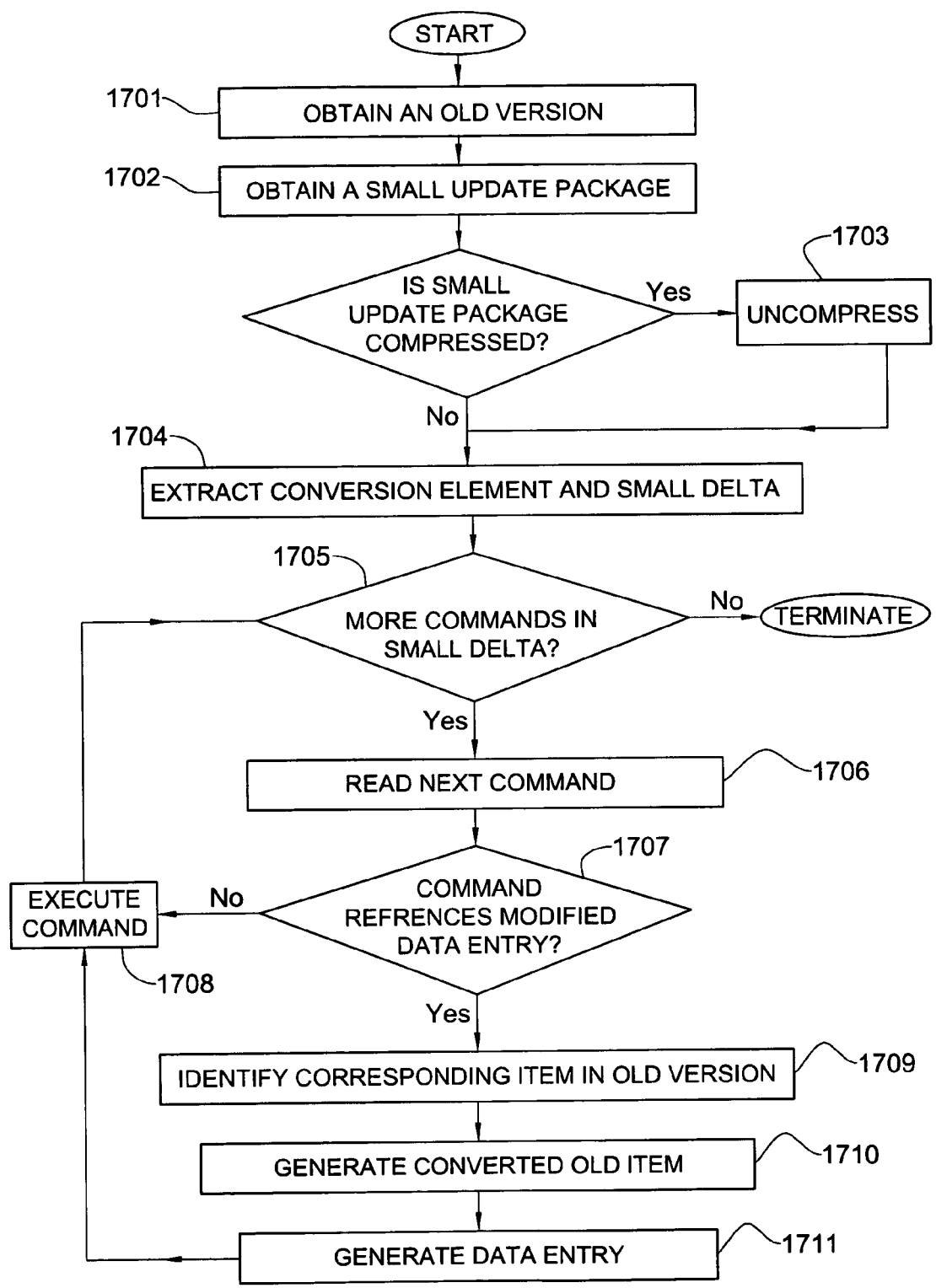
FIG. 17 is a flowchart describing in detail the update of an old version of content to a new version thereof using a small update package, in accordance with another embodiment of the invention.

FIG. 17 is a flowchart describing in detail the update of an old version of content to a new version thereof using a small update package, in accordance with the latter embodiment of the invention. After obtaining access (1701) to an old version and obtaining (1702) a small update package, and after uncompressing (1703) the small update package (if required), a conversion element and a small delta are extracted (1704) from the small update package. It is appreciated that the small delta includes modified data entries.

According to this embodiment commands included in the delta are executed successively and the generation of data entries is performed when required. Therefore, as long as in 1705 it is found that there are yet other un-executed commands in the commands section of the delta the next command is read (1706). If in 1707 it is found that this command refers to no data in the data section, or that it refers to a non-modified data entry, the command is executed (1708) and the process continues checking if more un-executed commands exist. However, if the commands refer to a modified data entry (in the data section or included in the commands, if the command is a discrete command), the item in the old version corresponding to this modified data entry is identified (1709) and the conversion element is applied to generate (1710) a corresponding converted old item. A data entry is generated (1711) then based on this converted old item and the corresponding modified data entry. The command then can be executed (1708) and applied to the generated data entry.

Figure 16:
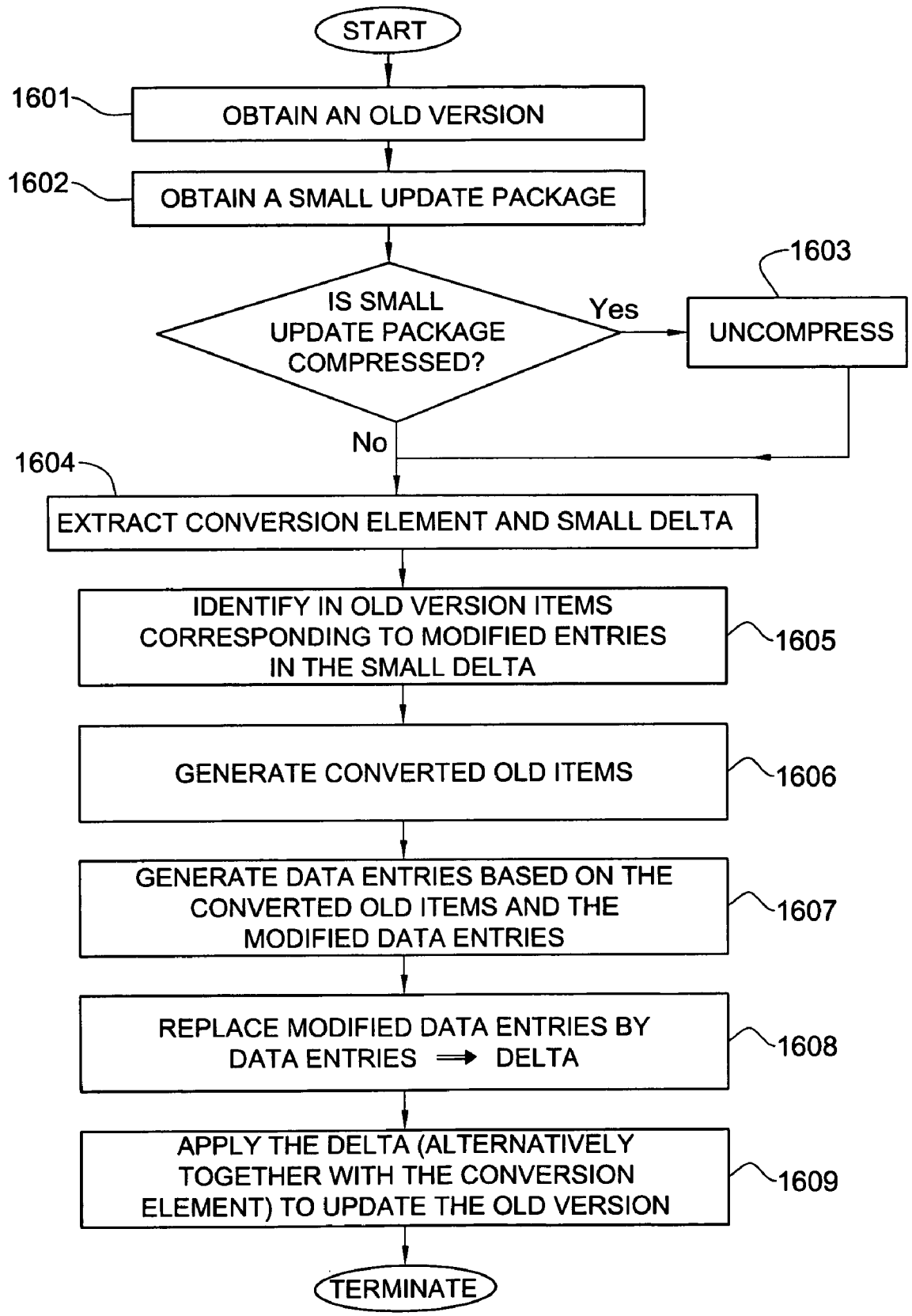
FIG. 16 is a flowchart describing in detail the update of an old version of content to a new version thereof using a small update package, in accordance with one embodiment of the invention.

It is appreciated that the flowcharts of FIGS. 16 and 17 are non-binding and other embodiments can exist as well wherein the order of operation is different or wherein other procedures are performed in order to update a new version to a new version using a small update package.

Figure 18:
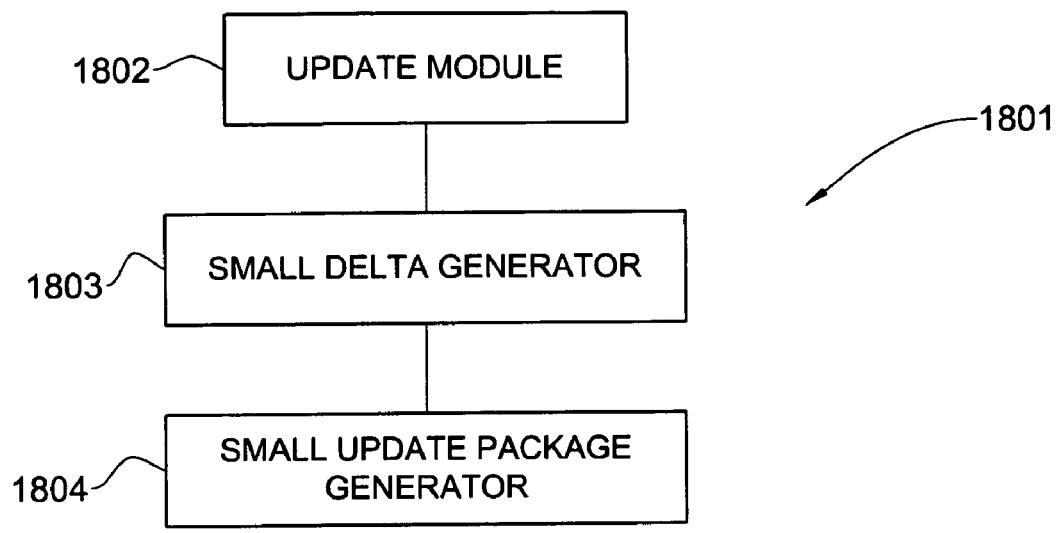
FIG. 18 is a block diagram illustrating a system for generating a small update package, in accordance with one embodiment of the invention.

Having described several embodiments for generating and applying small update packages and conversion elements, FIG. 18 is a block diagram illustrating a system 1801 for generating a small update package, according to one embodiment of the invention. An update module 1802 is coupled to a small delta generator 1803. The update module obtains a delta and a conversion element. The delta and/or the conversion element can be obtained, for example, by reading them from a storage device, by receiving them as input from a different program, by receiving them from a different networked device or by generation thereof.

The small delta generator 1803 generates a small delta that includes modified data entries. Generation of a small delta can be, for example, in accordance with the flow chart of FIG. 15. The small delta generator 1803 is coupled to a small update package generator 1804 that associates the conversion element with the small delta, generating a small update package thereby.

Figure 19:
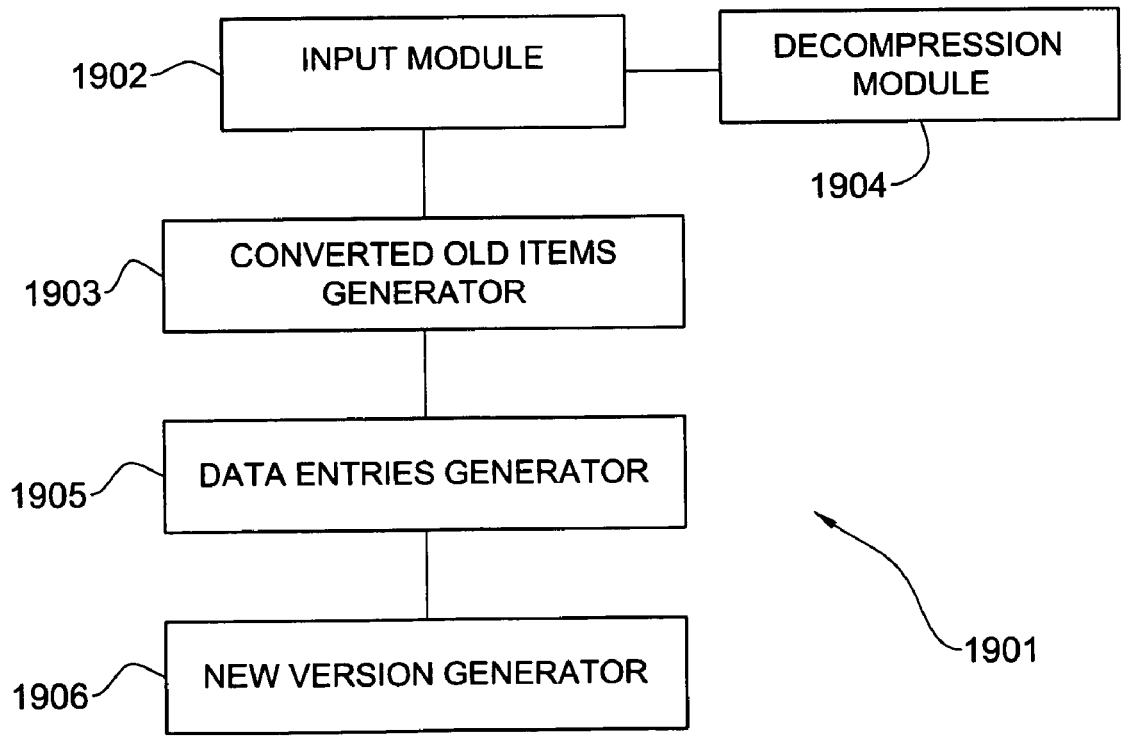
FIG. 19 is a block diagram illustrating a system for updating an old version of content giving rise to a new version of content, in accordance with one embodiment of the invention.

Turning now to the application of a small update package for updating an old version to a new version, FIG. 19 is a block diagram illustrating a system 1901 for updating an old version of content giving rise to a new version of content, in accordance with one embodiment of the invention. An input module 1902 is coupled to a converted old items generator 1903. The input module 1902 obtaining a small update package that according to the description above includes a small delta in association with a conversion element. The small update package can include the conversion element or a reference to a conversion element accessible to the system 1901.

It was previously explained that the small update package can be a compressed update package. If so, a decompression module 1904, coupled to the input module 1902 or included therein decompresses the compressed update package to form a small update package. It is appreciated that known decompression methods and/or tools can be utilized by the decompression module 1904, such as zip.

The converted old items generator 1903 generating converted old items based on the conversion element and on items in the old version corresponding to modified data entries in the small delta. An exemplary way of operation of the converted old items generator 1903 is illustrated in the flow chart of FIG. 16.

The converted old items generator 1903 is coupled to a data entries generator 1905 that generates data entries based on modified data entries and on their corresponding converted old items, generated by the converted old items generator 1903.

A new version generator 1906 applies commands included in the small delta and data entries generated by the data entries generator 1905 to the old version, giving rise to the new version.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The present invention has been described with a certain degree of particularity, but those versed in the art will readily appreciate that various alterations and modifications may be carried out, without departing from the scope of the following claims:

The invention claimed is:

1. A computer implemented method of generating a small update package adapted to enable an update of an old version of content to a new version of content, the method comprising:
   (i) obtaining a conversion element and a delta, said delta comprising update commands, wherein the commands are associated with data entries, wherein both versions are storable on a computer readable storage device and comprise items and reference items which are items that comprise a reference to another item or address, wherein at least some of the update commands are further associated with the reference items such that the reference in the items are changed by the update commands during the update, said conversion element comprising a plurality of shift rules, wherein said shift rules reflect shifts of items in the new version in view of their position in the old version, wherein the shift rules are set such that applying the shift rules on references of reference items in the old version yields a prediction of corresponding reference items in the new version and further yields a prediction of corresponding data entries in the delta;
   (ii) generating a small delta that includes modified data entries, the generation of said modified data entries comprising:
      a) applying said shift rules of said conversion element on the reference items of said old version, said reference items corresponding to data entries in said delta, giving rise to converted old items; and
      b) generating said modified data entries by computing distances between said data entries of said delta and corresponding converted old items; and
   (iii) generating said small update package by associating said conversion element with said small delta, wherein said generating further comprises compressing said small delta, giving rise to said small update package, wherein the compressing comprises compressing said conversion element; and
   (iv) outputting said small update package.

2. The method according to claim 1, wherein said delta is obtained by utilizing a diff tool between said old version and said new version.

3. The method according claim 1, wherein said delta includes commands section and data section and wherein said data entries are accommodated in said data section.

4. The method according claim 1, wherein said delta includes commands section and data section and wherein said data entries are accommodated in said commands section.

5. The method according to claim 1, wherein said shift rule is numerical shift rule.

6. The method according to claim 5, wherein said numerical shift rule is an integer shift rule.

7. The method according to claim 1, wherein said shift rule is a reference shift rule.

8. The method according to claim 7, wherein said at least one reference shift rule is associated with a difference table.

9. The method according to claim 8, wherein said difference table is based on at least meta-data associated with said one version of content and other version of content.

10. The method according to claim 9, wherein said meta-data includes at least content description data.

11. The method according to claim 10, wherein said content description data being a member in a group that includes at least map files, symbol tables and debug tables.

12. The method according to claim 1, wherein said content includes at least a computer program.

13. The method according to claim 12, wherein said computer program being an executable program.

14. The method according to claim 1, wherein said content includes data.

15. The method according to claim 1, for use in updating content stored in a storage device.

16. The method according to claim 15, wherein said storage device is coupled to an embedded device.

17. The method according to claim 16, wherein said embedded device being a member in a group that includes at least: cellular telephones and consumer electronic devices.

18. The method according to claim 15, wherein said storage device is coupled to a computer.

19. A computer implemented method of updating an old version of content giving rise to a new version of content, comprising:
  (i) obtaining a small update package including a small delta and a conversion element, wherein both versions are storable on a computer readable storage device and comprise items and reference items which are items that comprise a reference to another item or address, wherein at least part of the small delta is associated with the reference items such that the reference in the items are changed by the small delta during the update, said conversion element comprising a plurality of shift rules, wherein said shift rules reflect shifts of items in the new version in view of their position in the old version, wherein the shift rules are set such that applying the shift rules on references of reference items in the old version yields a prediction of corresponding reference items in the new version, said small delta including modified data entries and commands, wherein at least one of said shift rules is a numerical shift rule or a reference shift rule that is associated with a difference table, wherein said difference table is based on at least meta-data associated with said one version of content and other version of content, wherein said meta-data includes at least content description data;
  (ii) applying said conversion element on reference items of said old version giving rise to converted old items, said reference items corresponding to modified data entries in said small delta, the modified data entries represent distances between the converted old items and corresponding items of said new version;
  (iii) generating data entries based on said modified data entries and on said converted old items; and
  (iv) generating said new version by applying said commands and said data entries to said old version.

20. The method according to claim 19, wherein said (i) obtaining includes inputting said small update package.

21. The method according to claim 19, said (i) obtaining includes decompressing said small update package.

22. The method according to claim 19, wherein said content description data being a member in a group that includes at least map files, symbol tables and debug tables.

23. The method according to claim 19, wherein said content includes at least a computer program.

24. The method according to claim 23, wherein said computer program being an executable program.

25. The method according to claim 19, wherein said content includes data.

26. The method according to claim 19, wherein said old and new versions are stored in a storage device.

27. The method according to claim 26, wherein said storage device is associated with an embedded device.

28. The method according to claim 27, wherein said embedded device being a member in a group that includes at least: cellular telephones and consumer electronic devices.

29. The method according to claim 26, wherein said storage device is associated with a computer.

30. A program storage device readable by a machine, tangibly embodying a program of instructions executable by the machine to perform method steps for generating a small update package configured to enable an update of an old version of content to a new version of content, the method comprising:
  (i) obtaining a conversion element and a delta, said delta comprising update commands, wherein the commands are associated with data entries, wherein both versions are storable on a computer readable storage device and comprise items and reference items which are items that comprise a reference to another item or address, wherein at least some of the update commands are further associated with the reference items such that the reference in the items are changed by the update commands during the update said conversion element comprising a plurality of shift rules, wherein said shift rules reflect shifts of items in the new version in view of their position in the old version, wherein the shift rules are set such that applying the shift rules on references of reference items in the old version yields a prediction of corresponding reference items in the new version and further yields a prediction of corresponding data entries in the delta;
  (ii) generating a small delta that includes modified data entries; the generation of said modified data entries comprising:
    a) applying said shift rules of said conversion element on the reference items of said old version, said reference items corresponding to data entries in said delta, giving rise to converted old items; and
    b) generating said modified data entries by computing distances between said data entries of said delta and corresponding converted old items;
  (iii) generating said small update package by associating said conversion element with said small delta, wherein said generating further comprises compressing said small delta, giving rise to said small update package, wherein the compressing comprises compressing said conversion element; and
  (iv) outputting said small update package.

31. A program storage device readable by a machine, tangibly embodying a program of instructions executable by the machine to perform method steps for updating an old version of content giving rise to a new version of content, comprising:
  (i) obtaining a small update package including a small delta and a conversion element, wherein both versions are storable on a computer readable storage device and comprise items and reference items which are items that comprise a reference to another item or address, wherein at least part of the small delta is associated with the reference items such that the reference in the items are changed by the small delta during the update said conversion element comprising a plurality of shift rules, wherein said shift rules reflect shifts of items in the new version in view of their position in the old version, wherein the shift rules are set such that applying the shift rules on references of reference items in the old version yields a prediction of corresponding reference items in the new version, said small delta including modified data entries and commands, wherein at least one of said shift rules is a reference shift rule that is associated with a difference table, wherein said difference table is based on at least meta-data associated with said one version of content and other version of content, wherein said meta-data includes at least content description data;

(ii) applying said conversion element on reference items of said old version giving rise to converted old items, said reference items corresponding to modified data entries in said small delta, the modified data entries represent distances between the converted old items and corresponding items of said new version;

(iii) generating data entries based on said modified data entries and on said converted old items; and (iv) generating said new version by applying said commands and said data entries to said old version.

32. A computerized update package generator configured for generating a small update package adapted for allowing update of an old version of content to a new version of content and associating a small delta and a conversion element comprising a plurality of shift rules, comprising:

an update memory module configured for obtaining a conversion element and a delta, said delta comprising update commands, wherein the commands are associated with data entries, wherein both versions are storable on a computer readable storage device and comprise items and reference items which are items that comprise a reference to another item or address, wherein at least some of the update commands are further associated with the reference items such that the reference in the items are changed by the update commands during the update, said conversion element comprising a plurality of shift rules, wherein said shift rules reflect shifts of items in the new version in view of their position in the old version, wherein the shift rules are set such that applying the shift rules on references of reference items in the old version yields a prediction of corresponding reference items in the new version and further yields a prediction of corresponding data entries in the delta;

a small delta generator coupled to the update module and adapted for generating the small delta that includes modified data entries; wherein generation of said modified data entries comprises:

a) applying said conversion element on reference items of said old version, said reference items corresponding to data entries in said delta, giving rise to converted old items;

b) generating said modified data entries by computing distances between said data entries of said delta and the corresponding converted old items; and a small update package generator coupled to the small delta generator for generating said small update package by associating said conversion element with said small delta, wherein said generating further comprises compressing said small delta, giving rise to said small update package, wherein the compressing comprises compressing said conversion element; and outputting said small update package.

33. The system of claim 32, wherein in said update module obtaining includes generating said conversion element based on said old version and said new version.

34. The system of claim 32, wherein in said update module obtaining includes generating said delta based on said old version and said new version.

35. A computerized content-computing system capable of updating an old version of the content giving rise to a new version of the content, comprising:

an input memory module configured to obtaining a small update package including a small delta and a conversion element, wherein both versions are storable on a computer readable storage device and comprise items and reference items which are items that comprise a reference to another item or address, wherein at least part of the small delta is associated with the reference items such that the reference in the items are changed by the small delta during the update; said conversion element comprising a plurality of shift rules, wherein said shift rules reflect shifts of items in the new version in view of their position in the old version, wherein the shift rules are set such that applying the shift rules on references of reference items in the old version yields a prediction of corresponding reference items in the new version, said small delta including modified data entries and commands, wherein at least one of said shift rules is a reference shift rule that is associated with a difference table, wherein said difference table is based on at least meta-data associated with said one version of content and other version of content, wherein said meta-data includes at least content description data;

a converted old items generator coupled to the input memory module and configured to applying said conversion element to items of said old version giving rise to converted old items, said items corresponding to modified data entries in said small delta;

a data entries generator coupled to the converted old items generator and configured to generating data entries based on said modified data entries and on said converted old items; and a new version generator coupled to the data entries generator and configured for generating said new version by applying said commands and said data entries to said old version.

36. The system according to claim 35, further comprising a decompression module coupled to said input module for decompressing said small update package.

37. A computer implemented method of generating a compact delta file comprising:

obtaining an old version of content and a new version of content, both versions include items and storable on a computer readable storage device;

comparing between the old version and the new version thereby generating a delta file comprising: insert commands, delete commands, and replace commands, wherein the commands are associated with data entries relating to the computer readable storage device, and wherein the replace commands are further associated with reference items whose references are being changed by the replace commands during the update;

deriving, from the insert commands and the delete commands, a set of shift rules, wherein the shift rules represent address shifts of items in the new version in view of their corresponding position in the old version, wherein the shift rules are set such that applying the shift rules on references of reference items in the old version yields a prediction of corresponding actual reference items in the new version and a prediction of corresponding actual replace data entries in the delta file;

computing, using a predefined distance function, a replace data entries distance between the actual replace data entries and corresponding predicted replace data entries; and substituting, in the delta file, the actual replace data entries, with corresponding computed replace data entries distances, thereby generating a compact delta file; and storing the compact delta on a target device comprising a computer readable storage device.

38. The method according to claim 37, further comprising:

deriving, from the compact delta, the insert commands, delete commands and replace data entries distances;

deriving, from the insert commands and the delete commands, the set of shift rules;

computing the predicted replace data entries by applying the shift rules on references of reference items in the old version;

computing the actual replace data entries, by applying the predefined distance function on the predicted replace data entries and corresponding replace data entries distance; and updating the old version of content on the storage device to the new version of content using the delta obtained from the compact delta by substituting the replace data entries distance by corresponding computed actual replace data entries.

* * * * *